US010704981B2

(12) United States Patent
Choudhury et al.

(10) Patent No.: US 10,704,981 B2
(45) Date of Patent: Jul. 7, 2020

(54) REMOTE LEAK DETECTION SYSTEM

(71) Applicant: General Electric Company, Schenectady, NY (US)

(72) Inventors: Niloy Choudhury, Niskayuna, NY (US); Cheng-Po Chen, Niskayuna, NY (US); Radislav Alexandrovich Potyrailo, Niskayuna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 114 days.

(21) Appl. No.: 15/479,751

(22) Filed: Apr. 5, 2017

(65) Prior Publication Data
US 2018/0188129 A1 Jul. 5, 2018

Related U.S. Application Data

(60) Provisional application No. 62/442,215, filed on Jan. 4, 2017.

(51) Int. Cl.
G01M 3/04 (2006.01)
G01N 21/85 (2006.01)
G01N 21/3504 (2014.01)
G01N 21/39 (2006.01)

(52) U.S. Cl.
CPC .......... G01M 3/04 (2013.01); G01N 21/3504 (2013.01); G01N 21/85 (2013.01); G01N 21/39 (2013.01); G01N 2021/8578 (2013.01)

(58) Field of Classification Search
CPC ....................................................... G01M 3/04
USPC ........................................................ 73/40.7
See application file for complete search history.

(56) References Cited

U.S. PATENT DOCUMENTS

| 3,662,171 | A | 5/1972 | Brengman et al. |
| 6,895,335 | B2 | 5/2005 | Archibald et al. |
| 7,075,653 | B1 | 7/2006 | Rutherford |
| 8,479,807 | B2 | 7/2013 | Short |
| 2006/0114464 | A1 | 6/2006 | Klingenberg et al. |

(Continued)

FOREIGN PATENT DOCUMENTS

CN  203239330 U  10/2013

OTHER PUBLICATIONS

International Search Report and Written Opinion issued in connection with corresponding PCT Application No. PCT/US2017/062835 dated Feb. 21, 2018.

(Continued)

Primary Examiner — Justin Seo
Assistant Examiner — Rodney T Frank
(74) Attorney, Agent, or Firm — Laura L. Pollander

(57) ABSTRACT

A scanning system for producing a path averaged concentration map of a leaking plume is provided. The system includes a tunable light source capable of tuning its wavelength over the absorption band of the specimen of interest, a lightweight mirror to scan the light, a lightweight collection optic, an array of detectors to measure reflected light, one or more processors configured to align the scanning with the detected signal and analyze the signal to produce a path averaged concentration map of the leaking plume, the one or more processors configured to use an analytical model of plume dynamics to compare the detected concentration map and calculate leak location and rate, and a flying platform that can fly in a control flight path.

21 Claims, 18 Drawing Sheets

(56) References Cited

U.S. PATENT DOCUMENTS

| | | | |
|---|---|---|---|
| 2009/0055103 A1 | 2/2009 | Gilbert et al. | |
| 2010/0131207 A1 | 5/2010 | Lippert et al. | |
| 2010/0268480 A1* | 10/2010 | Prince | G01N 1/26 702/24 |
| 2011/0213554 A1* | 9/2011 | Archibald | G01V 9/007 702/6 |
| 2012/0176621 A1 | 7/2012 | Doull | |
| 2014/0110124 A1 | 4/2014 | Goldner | |
| 2016/0069162 A1 | 3/2016 | Lynch | |

OTHER PUBLICATIONS

Shakmak et al. "Detection of water leakage in buried pipes using infrared technology; A comparative study of using high and low resolution infrared cameras for evaluating distant remote detection", 2015 IEEE Jordan Conference on Applied Electrical Engineering and Computing Technologies (AEECT), Nov. 3-5, 2015, p. 1-7, Conference Location: Amman.

Humayun et al. "Ubiquitous Low-Cost Functionalized Multi-Walled Carbon Nanotube Sensors for Distributed Methane Leak Detection", IEEE Sensors Journal, Dec. 15, 2016, vol. 16 Issue: 24 pp. 8692-8699.

Calculated from data presented in EPA 430-R-13-001, "Inventory of U.S. Greenhouse Gas Emissions and Sinks:1990-2011.", Apr. 12, 2013. 505 pages.

S.M. Miller, et al., "Anthropogenic emissions of methane in the United States", PNAS 110(50):20018-20022 (2013). 5 pages.

A. Karion, et al., "Methane emissions estimate from airborne measurements over a western United States natural gas field", Geophys. Res. Lett. 40(16):4393-4397 (2013). 5 pages.

J. Peischl, et al., "Quantifying sources of methane using light alkanes in the Los Angeles basin, California", J. Geophys. Res. Atmos. 118(10):4974-4990 (2013). 17 pages.

* cited by examiner

REMOTE LEAK DETECTION SYSTEM

CROSS-REFERENCE TO RELATED APPLICATIONS

This application claims priority to U.S. Provisional Application No. 62/442,215, which was filed on 4 Jan. 2017, and the entire disclosure of which is incorporated herein by reference.

FIELD

Embodiments of the subject matter disclosed herein relate to systems identify leaks, such as gas leaks, using remotely located devices.

BACKGROUND

After carbon dioxide (CO2), methane (CH4) is estimated to be one of the largest contributors to global warming. The Environmental Protection Agency (EPA) estimates that 30% of all anthropogenic methane emission occurs from oil and natural gas operations in U.S. This corresponds to 1.65% of natural gas production in U.S. There are certain studies that put that estimate at around 2.8% of the production. There are also studies indicating that methane gas emission occurs at a much higher rate at production site (well heads). In those studies, methane emission is estimated to be anywhere from 6% to 17% of production, depending on the location of the study.

Hence, from an environmental perspective, it is very important to identify and quantify sources of methane emission, so that corrective steps can be taken. Additionally, from an economic standpoint of oil and natural gas producers, knowing the sources and amount of methane leaks can potentially lead to steps to capture more of lost product, and hence more profit.

It is therefore very important to identify and quantify the amount of methane leaking from oil and gas operations, as well as from the well heads.

Some known technologies for detecting methane leaks involve using an infra-red (IR) camera to image well pads and qualitatively look for methane emission signatures to identify a location of a leak. Using this technology, it may not be possible to quantify the leak rate. Additionally, the cost of these IR cameras is of the order of tens of thousands of dollars, making this solution cost prohibitive to be deployed at every well pad. One attempted solution to reduce this cost is to move the IR cameras from well pad to well pad. This process is time consuming and expensive to monitor all the production well pads.

BRIEF DESCRIPTION

In one embodiment, a scanning system for producing a path averaged concentration map of a leaking plume is provided. This map optionally is referred to as a path averaged map. The system includes a tunable light source capable of tuning its wavelength over the absorption band of the specimen of interest, a lightweight mirror to scan the light, a lightweight collection optic, an array of detectors to measure reflected light, one or more processors configured to align the scanning with the detected signal and analyze the signal to produce a path averaged concentration map of the leaking plume, the one or more processors configured to use an analytical model of plume dynamics to compare the detected concentration map and calculate leak location and rate, and a flying platform that can fly in a control flight path.

In one embodiment, a sensing system includes one or more processors configured to determine measured concentrations of a fluid of interest and locations of the measured concentrations. The one or more processors are configured to compare the measured concentrations and the locations with modeled plumes of a leak of the fluid of interest. The one or more processors also are configured to determine one or more of an amount of the fluid of interest exiting from the leak or a source location of the leak based on comparing the measured concentrations and the locations with modeled plumes of the leak of the fluid of interest.

In one embodiment, a sensing system includes one or more processors configured to determine measured concentrations of a fluid of interest and locations of the measured concentrations. The one or more processors are configured to compare the measured concentrations and the locations with modeled plumes of a leak of the fluid of interest. Different modeled plumes are associated with different ambient conditions. The one or more processors are configured to determine one or more of an amount of the fluid of interest exiting from the leak or a source location of the leak based on comparing the measured concentrations and the locations with one or more of the modeled plumes of the leak of the fluid of interest associated with the ambient conditions in which the measured concentrations of the fluid were determined.

In one embodiment, a method includes determining measured concentrations of a fluid of interest, determining locations where the measured concentrations were measured, comparing the measured concentrations and the locations with modeled plumes of a leak of the fluid of interest, and determining one or more of an amount of the fluid of interest exiting from the leak or a source location of the leak based on comparing the measured concentrations and the locations with modeled plumes of the leak of the fluid of interest.

BRIEF DESCRIPTION OF THE DRAWINGS

The subject matter described herein will be better understood from reading the following description of non-limiting embodiments, with reference to the attached drawings, wherein below.

DETAILED DESCRIPTION

One or more embodiments of the inventive subject matter described herein provide systems and methods that identify and quantify fluid (e.g., gas) leaks using moveable remote sensors. In one embodiment, gas leaks in well pads or other locations are detected using a miniaturized tunable diode laser absorption spectroscopy (TDLAS) system (or another sensing system) that is coupled with a vehicle, such as an unmanned aircraft (e.g., a small quad copter) that is flown over well pads. The sensing system sends a laser beam at a methane absorption wavelength and captures the reflected laser light. The loss in signal will be proportional to the concentration of absorbing gas (e.g., methane) that is present in the path of the laser beam. By tuning the laser wavelength across an absorption peak of methane, the system can estimate the methane concentration in the path traversed by the light. By scanning the laser beam over a two dimensional area, the system can create a two dimensional map of methane concentration below the vehicle. The system optionally can quantify the leak by estimating or calculating the methane leak rate and geographic location. Optionally, the system determines the rate at which the fluid (e.g., gas) leaks from the pipe or other source.

Figure 1:
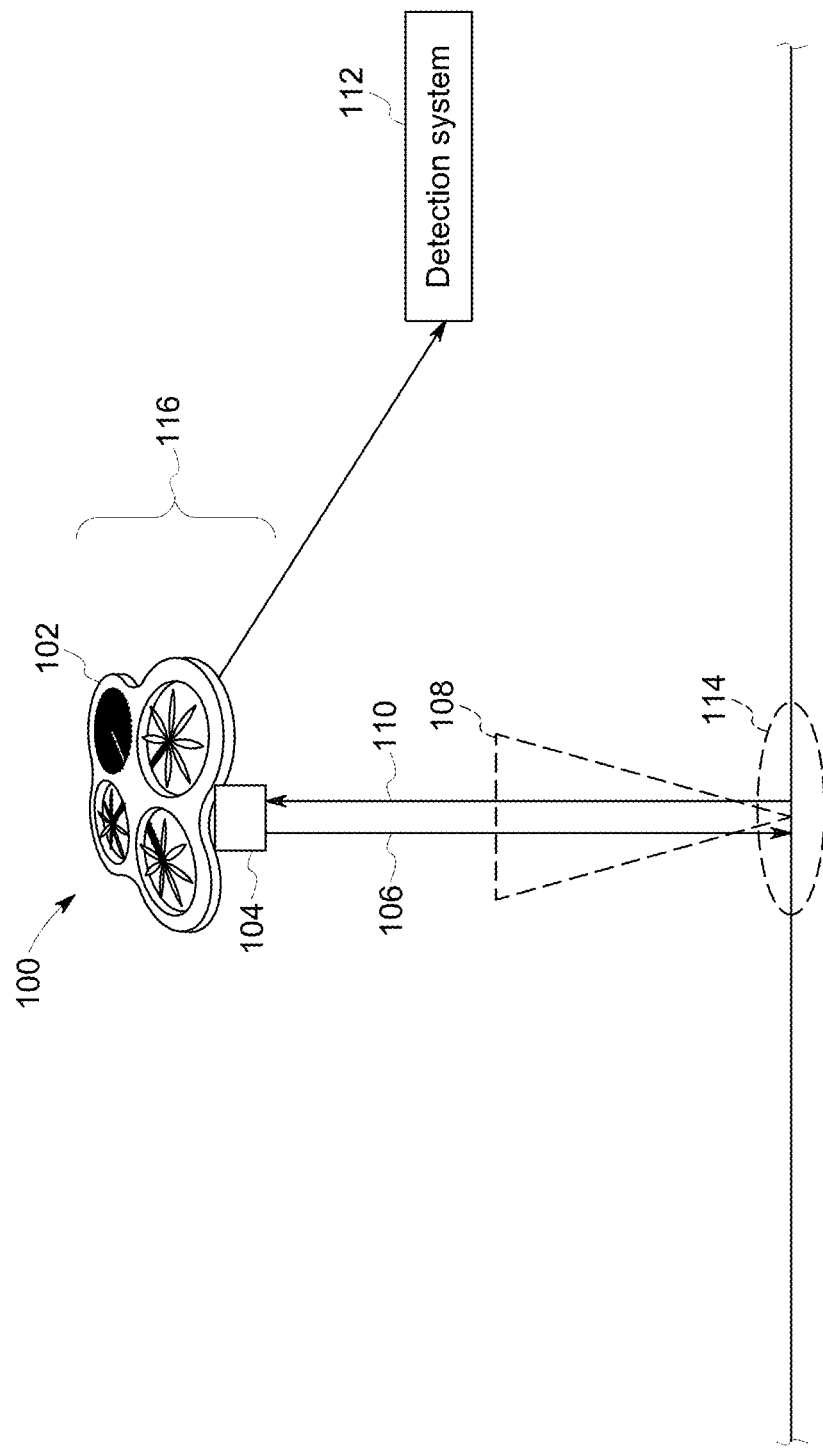
FIG. 1 illustrates one embodiment of a remote leak sensing system.

FIG. 1 illustrates one embodiment of a remote leak sensing system 100. The sensing system includes a mobile sensing system 116 and a detection system 112. The mobile sensing system 112 includes vehicle 102 with one or more remote sensors 104 carried by the vehicle. In the illustrated embodiment, the vehicle 102 is an unmanned aircraft vehicle (UAV), such as a drone, quad-copter, etc. Optionally, the vehicle 102 can be a fixed wing aircraft, a manned aircraft, or the like. The remote sensor 104 emits light 106 toward an area under examination 114 for a fluid leak 108, such as a methane leak. For example, the sensor 104 can represent one or more light sources that emit light (e.g., lasers emitting laser light) at a wavelength that is at least partially absorbed by a fluid or analyte of interest. The sensor 104 also can include one or more light sensitive devices, such as photodetectors, that measure the intensity of the light emitted by the one or more light sources after being reflected off the ground and optionally at least partially absorbed by the fluid or analyte of interest.

The area under examination 114 can be or include a well head of a mining operation, an area above or on a pipe, a surface of the earth or building in which a pipe is located, etc. The emitted light 106 has a wavelength that is absorbed by a fluid or analyte of interest, such as methane, more than other fluids, such as gases other than methane. The emitted light 106 is reflected off one or more surfaces back to the remote sensor 104 as reflected light 110.

The intensity of the reflected light 110 can be reduced relative to the emitted light 106. This reduction in intensity can occur due to at least partial absorption of the emitted and/or reflected light by the fluid of interest in the leak 108. If the emitted light 106 is directed into and/or the reflected light 110 passes through a leak 108 that includes the gas of interest, more of the emitted and/or reflected light 106, 110 is absorbed than if the emitted light 106 and/or reflected light 110 did not pass through the leak 108. Additionally, the amount of the fluid of interest can impact how much of the light is absorbed. As a result, the intensity of the reflected light 110 that is received by the remote sensor 104 can indicate the presence and/or amount of the gas of interest in the area 114 in which the emitted light 106 was directed.

The sensor 104 (or other hardware circuitry onboard the vehicle 102) can communicate locations where the emitted light 106 was directed and the corresponding intensity of the reflected light 110 (and/or the decrease in intensity from the emitted light 106 to the reflected light 110) to an off-board detection system 112. Optionally, one or more components of the detection system 112 can be disposed onboard the vehicle 102. The detection system 112 receives the locations and reductions in intensity of light, and can quantify the leak 108 that is detected. The leak 108 can be quantified by the detection system 112 determining the geographic location of the leak 108, as well as the amount or rate of the fluid of interest in the leak 108. As described in more detail below, the amount or rate of the fluid of interest in the leak 108 and the location of the leak 108 can be determined based on models of the spatial spread of the fluid of interest caused by external factors, such as the direction of wind, the wind speed, ambient temperature, and/or ambient pressure. For example, the geographic location where the emitted light 106 was directed may not be an entirely accurate indicator of where the source of the leak 108 is located or how much of the fluid of interest is leaking, as the wind can move the fluid of interest away from the source of the leak, and other ambient conditions can impact how quickly the fluid of interest disperses out of the source of the leak.

Figure 2:
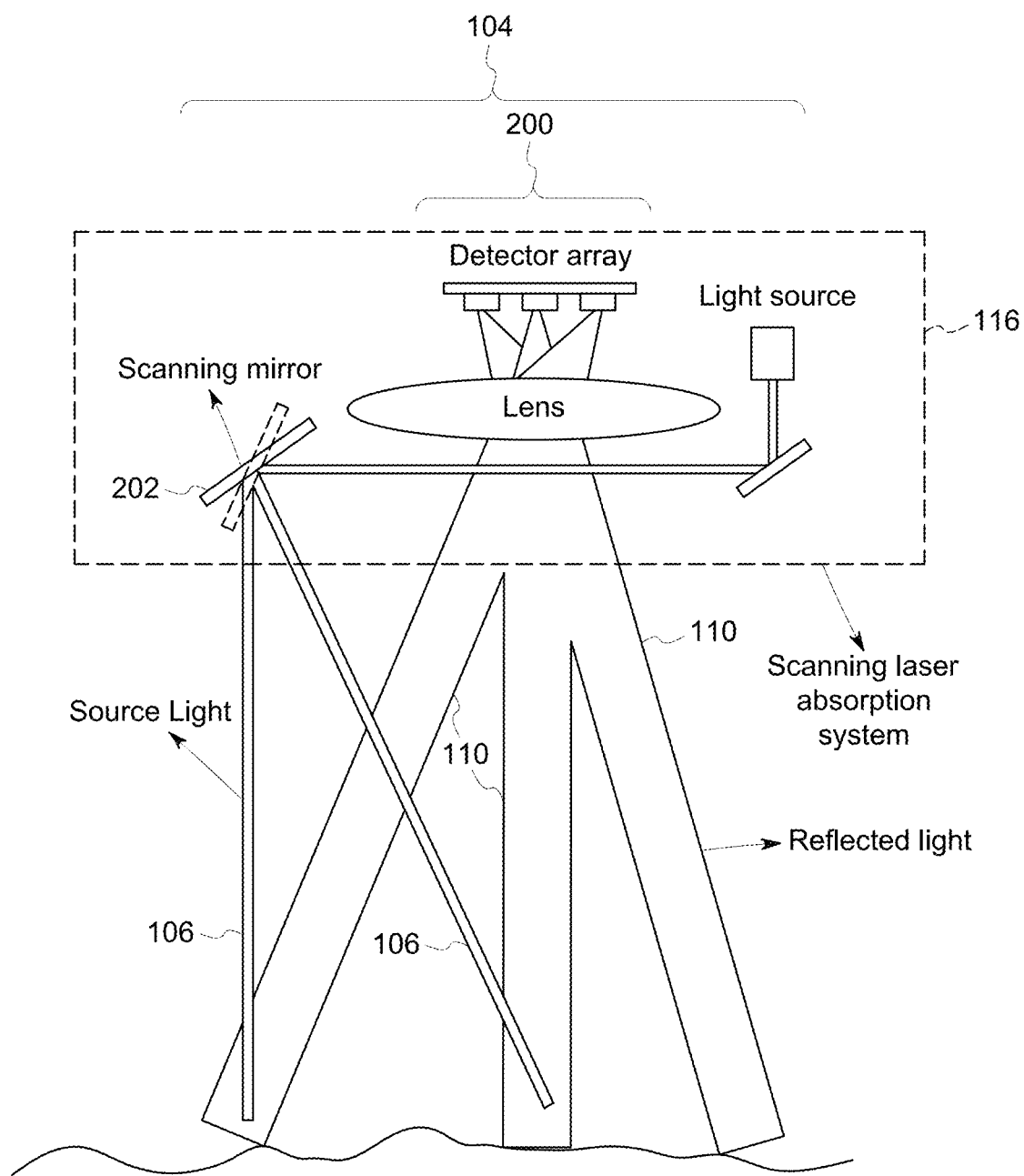
FIG. 2 illustrates one example of a mobile sensing system shown in FIG. 1.

FIG. 2 illustrates one example of the mobile sensing system 116 shown in FIG. 1. In this embodiment of the mobile sensing system 116, a collection aperture 200 of the sensor 104 and a laser scanning mirror 202 of the sensor 104 are separated. The reflected light from the target is detected using a detector array. Using this configuration, it is possible to capture the light reflected from a wide angle even though the transmitted beam of the emitted light 106 and the reflected light 110 received along a detected path are not scanned together (e.g., at the same time). The mirror 202 is moveable based on signals received from the controller of the system in order to direct emitted light from the light source(s) in different directions.

As described herein, a 2D map of the concentrations of the fluid of interest is generated by the sensing systems in one embodiment. The density of the fluid of interest (e.g., methane), the wind speed during measurements of the fluid of interest concentrations, the speed of the vehicle 102 during measurements of the fluid of interest concentrations, the measured concentrations of the fluid of interest, and/or the time period over which the concentrations were measured optionally are used by the sensing systems (e.g., by analysis processor(s) 702 described below) to determine a rate at which the fluid of interest is leaking from a container (e.g., a conduit). This rate may be referred to as a leak rate, and can be determined based on the following relationship:

$$f = \rho \int_{t_1}^{t_2} v_w \cdot v_d S \, dt$$

where f represents the flow rate of the fluid of interest (e.g., methane) in the plume (e.g., in units of kilograms per second), $\rho$ represents the density of the fluid of interest (e.g., methane) (e.g., in units of kilograms per cubic meter), $v_m$ represents the wind speed and is a vector of the wind speed, $v_d$ represents the speed of the vehicle and is a vector of the vehicle speed with a dot product vector multiplication operation between these two vectors, S is the signal provided by the sensor 104 that represents the concentration of the fluid of interest (e.g., in units of parts per million times meters). The two velocities and concentration may be functions of time, and the integral is over time from $t_1$ to $t_2$ as the vehicle 102 flies across the plume of the fluid of interest. Note that as long as the vehicle flies completely across the plume in a time that is short compared to changes in wind direction, then the path of the vehicle 102 should not impact the calculation of the flow rate.

Figure 3:
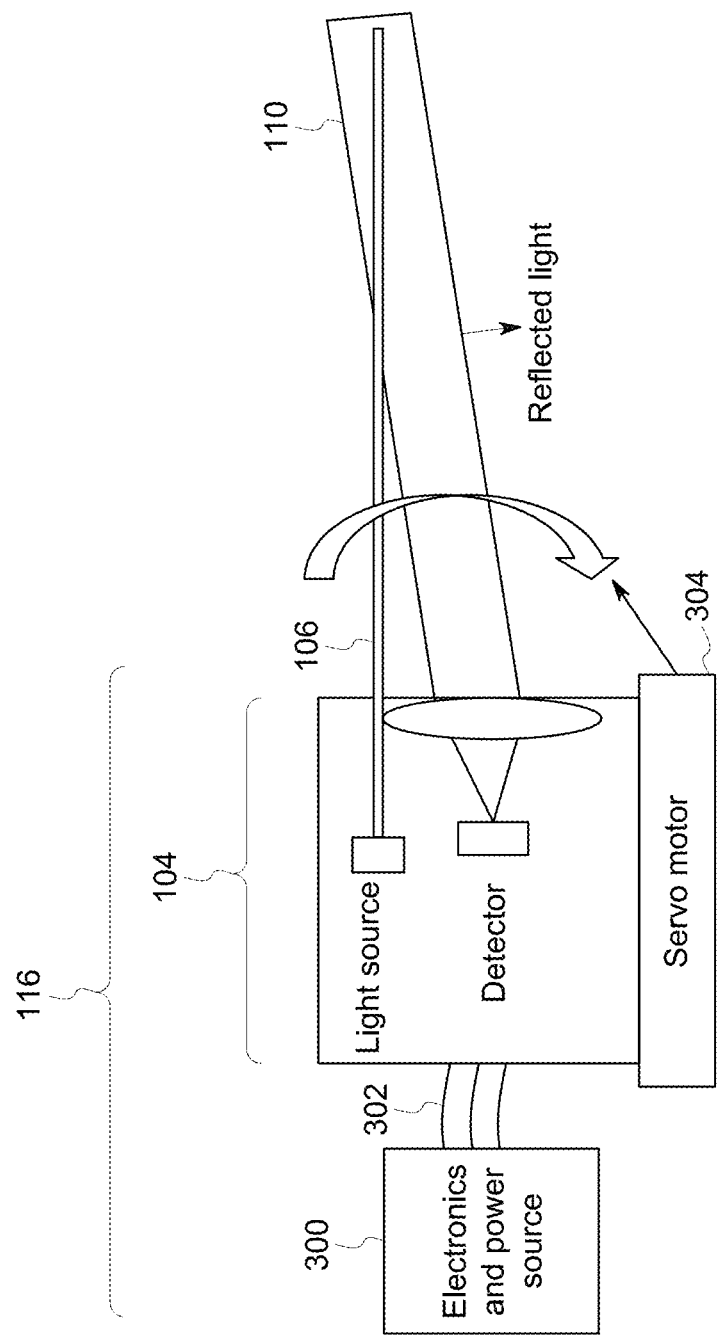
FIG. 3 illustrates another example of the mobile sensing system shown in FIG. 1.

FIG. 3 illustrates another example of the mobile sensing system 116 shown in FIG. 1. In this embodiment, the light source of the sensor 104 (e.g., a laser) and the light sensitive components of the sensor 104 (e.g., a detector) are connected to the electronic hardware circuitry and a power source 300 of the system 116 with flexible wiring 302, and the light source and the detector are moved (e.g., scanned) using a motor 304, such as a low power motor. The sensing system 116 may be stationary, with the motor 304 moving the sensor 104 relative to the areas being examined. Optionally, the motor 304 and sensor 104 may be coupled with the vehicle 102 and the motor 304 can move the sensor 104 relative to the vehicle 102. Using one or more of these configurations, the emitted light beam 106 and the reflected light 110 can be scanned together with a low power servo motor 304.

Figure 4:
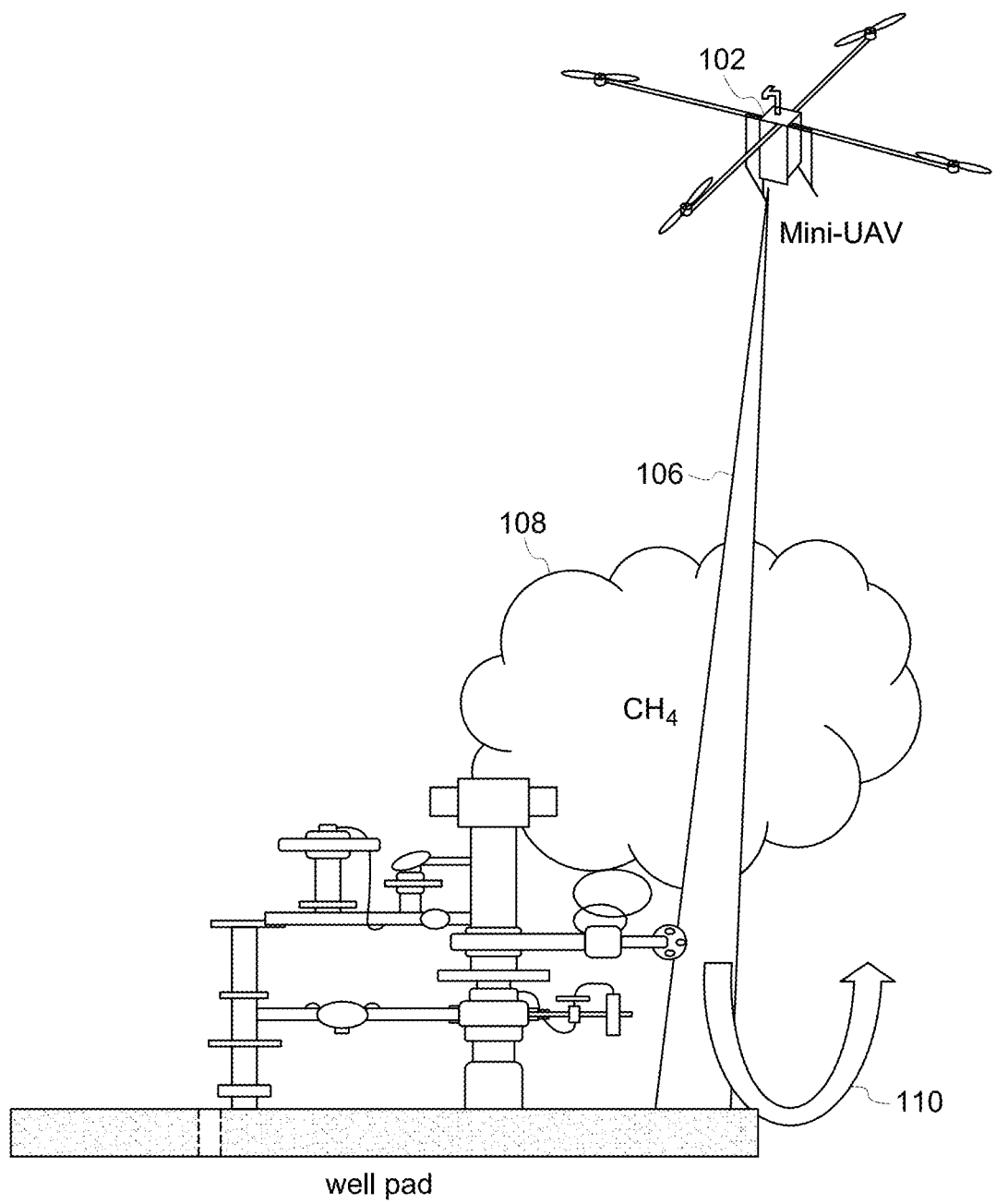
FIG. 4 illustrates another example of the mobile sensing system.

FIG. 4 illustrates another example of the mobile sensing system 116. The sensing system 116 may operate to locate and quantify leak rates from oil and gas production facilities in one embodiment. The system 116 may operate by flying an infra-red sensor chip and a miniaturized TDLAS (Tunable Diode Laser Absorption Spectroscopy) system as the sensor 104 on a small drone as the vehicle 102. As the drone flies over an installation of possible leaking gas, the infra-red imager captures the image of the plume of the leaking gas. The plume is detected by the infrared imager, because of the temperature difference between the leaking gas and the background. This image is a measure of the temperature difference, and hence getting concentration or leak rate may not be possible.

Once the plume is located, the UAV 102 continues on a flight path at a certain height above the plume and the TDLAS sensor 104 quickly scans the leaking plume in the direction that is perpendicular to the UAV flight path. The TDLAS system 104 provides a path-averaged one-dimensional (1D) map of the leaking plume at every or many UAV locations and, as the UAV flies over the plume, a 2D projection of the plume is produced in one embodiment. If the wind speed and the drone 102 speed are known, the leak rate and location of the source of the leak can be calculated by simulating the leak rate that will produce the two-dimensional (2D) map, as described in more detail below.

Figure 5:
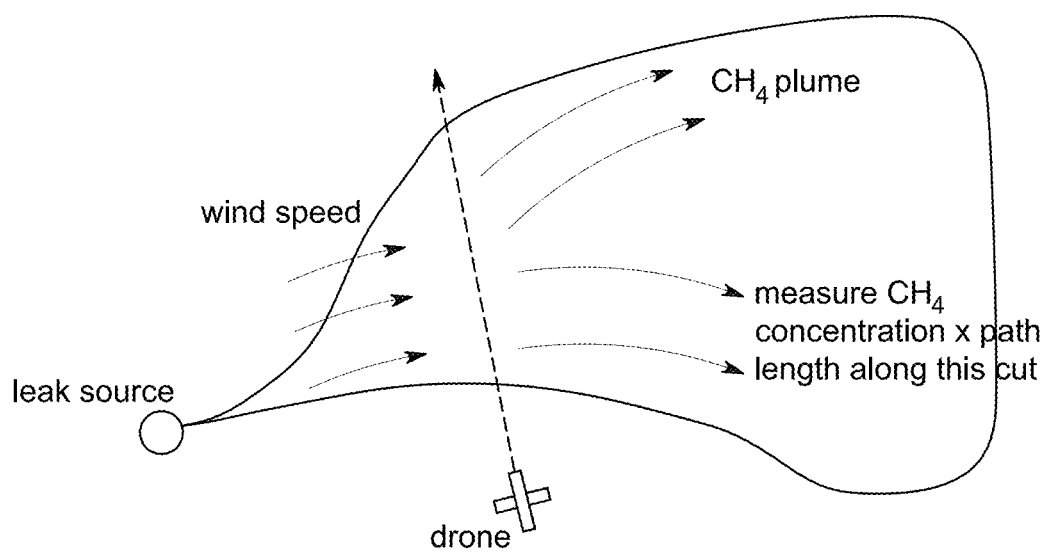
FIG. 5 schematically illustrates how a 2D map is produced from a leaking site according to one embodiment.

FIG. 5 schematically illustrates how a 2D map is produced from a leaking site with a leak rate of Q g/s according to one embodiment. The system compares the detected 2D projection of the leaking plume to a leak and plume model to estimate the leak rate and location in one example of how the sensing system can operate.

In order to use a TDLAS system on a drone and produce 2D scanning, the entire system using the scanner is made to be small with low weight. In some optical sensors 104, the light source and the reflected light detectors are optically scanned together. For example, the light source and the light sensitive device can be moved in similar or the same directions at the same time during scanning (e.g., by the controller of the system). Scanning mirrors direct the light source to the location to be interrogated and, at the same time, collects the reflected light and sends the reflected light to the detector. In this arrangement, the size of the mirror determines the aperture of the light collection and in order to increase light collection, the aperture needs to be made large. This can lead to having larger mirrors, which increases the weight of the system. Increased weight leads to more power consumed by the scanning device (which effects both weight and power consumption of the device).

Alternatively, the light source scanning and light collection devices can be separated, as shown in FIG. 2. The light from the laser source is scanned using a microelectromechanical systems (MEMS) mirror (which is smaller and requires less power consumption relative to scanning large mirrors). The reflected light from the ground is collected using a wide angle lens. The wide angle directs the light along a line in the image plane of collection for light reflecting back from different scan positions. An array of detectors is placed on the image plane to collect light from different locations. This design means that the receiver aperture is independent of the scanning mirror size. As a result, light weight lenses can be used for light collection. Optionally, the electronics, power source and other bulkier or heavier components of the system are placed on a fixed platform, while the light source and the detector are placed on a rotating platform, as shown in FIG. 3. The weight of the optical components are less than the electronics driving them and the power source (batteries). As a result, the motor used to scan the lightweight optical components can be small and efficient.

Figure 6:
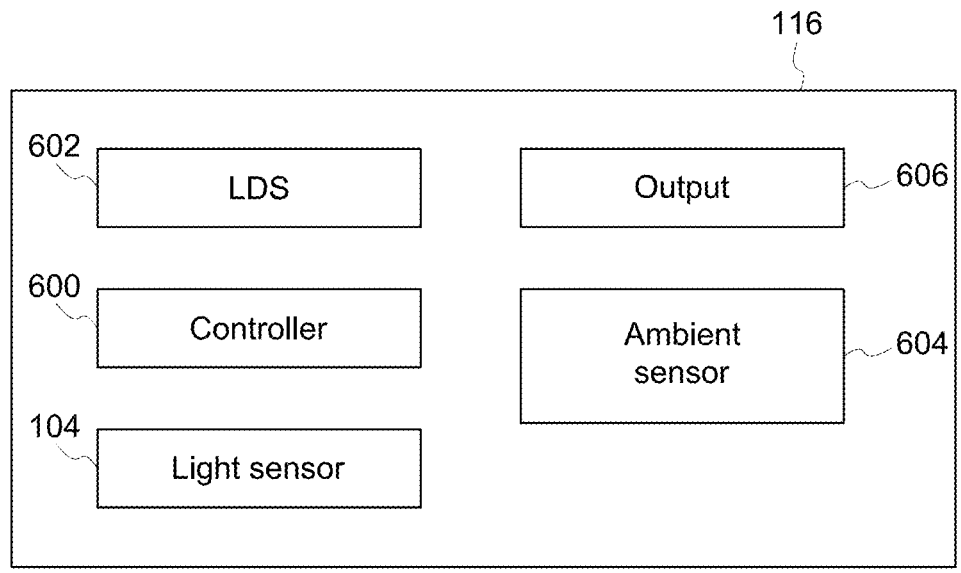
FIG. 6 illustrates one embodiment of a mobile sensing system shown in FIG. 1.

FIG. 6 illustrates one embodiment of the mobile sensing system 116 shown in FIG. 1. The mobile sensing system 116 includes the vehicle 102 (shown in FIG. 1) with the one or more sensors 104 ("Light Sensor" in FIG. 6) that transmit the emitted light 106 (shown in FIG. 1) and receive (e.g., sense) the intensity of the reflected light 110 (shown in FIG. 1). A controller 600 represents hardware circuitry that includes and/or is connected with one or more processors (e.g., one or more microprocessors, field programmable gate arrays, and/or integrated circuits). This circuitry and processors can control operation of the sensor 104 by generating and communicating signals to the sensor 104 to direct the sensor 104 to emit the light 106 toward the area of interest 114 (shown in FIG. 1). The controller 600 also can examine the intensity of the reflected light 110 that is received by the sensor 104 to determine how much of the emitted light 106 and/or reflected light 110 was absorbed by the fluid of interest.

A location determining system 602 ("LDS" in FIG. 6) represents hardware circuitry that includes and/or is connected with one or more processors (e.g., one or more microprocessors, field programmable gate arrays, and/or integrated circuits). The location determining system 602 can include or represent a global positioning system receiver or other wireless communication device that can determine the geographic location of the vehicle 102, such as the longitude, latitude, altitude, etc., of the vehicle 102. The location determining system 602 can communicate the location of the vehicle 102 to the controller 600 so that the controller 600 can associate different reductions in intensity of the emitted light 106 with different locations.

One or more ambient sensors 604 ("Ambient Sensor" in FIG. 6) detect ambient conditions in which the vehicle 102 and the light sensor 104 operate. For example, the ambient sensors 604 can include a thermometer that measures ambient temperature, a barometer that measures atmospheric pressure, an anemometer that measures wind speed, a wind vane that measures wind direction, and the like. The temperatures, pressures, wind speeds, and/or directions can be communicated from the ambient sensors 604 to the controller 600 and/or to an output device 606 ("Output" in FIG. 6).

The output device 606 includes hardware transceiving or transmitting circuitry that communicates the changes in light intensity measured by the light sensor 104, locations associated with the changes in light intensity, and/or the ambient conditions sensed by the ambient sensors 604 to an off-board location, such as the detection system 112 (shown in FIG. 1). The output device 606 can include an antenna, modem, and the like, for wirelessly communicating this information during movement of the vehicle 102. Optionally, the output device 606 can represent a conductive connection, such as a connector, that is connected with the detection system 112 by one or more wired connections.

Figure 7:
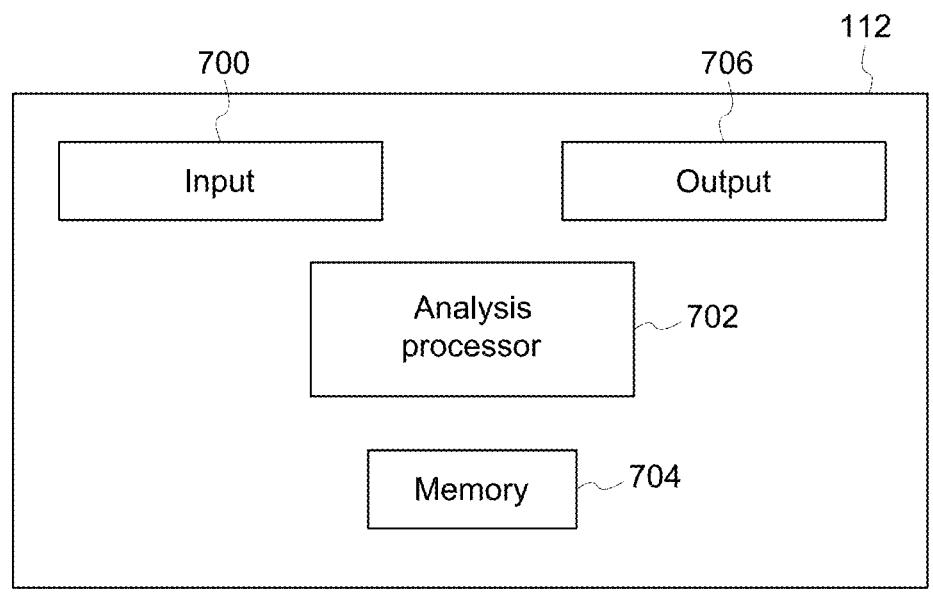
FIG. 7 illustrates one embodiment of a detection system shown in FIG. 1.
Figure 8:
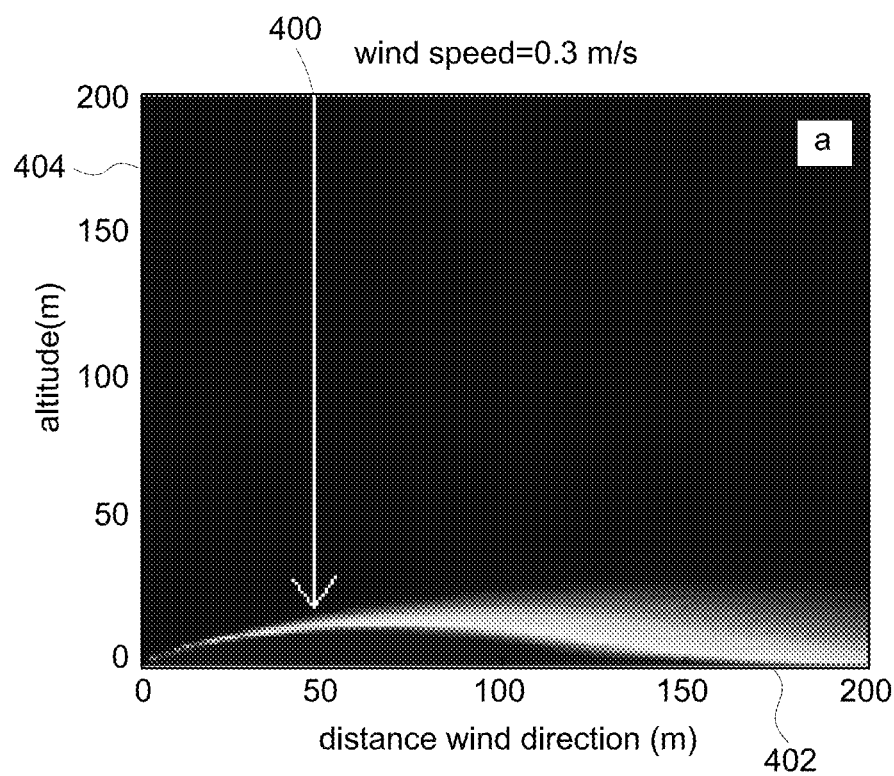
FIG. 8 illustrates an altitude spread model of plumes, or spatial spreads, of a leak of a fluid of interest according to one example.
Figure 9:
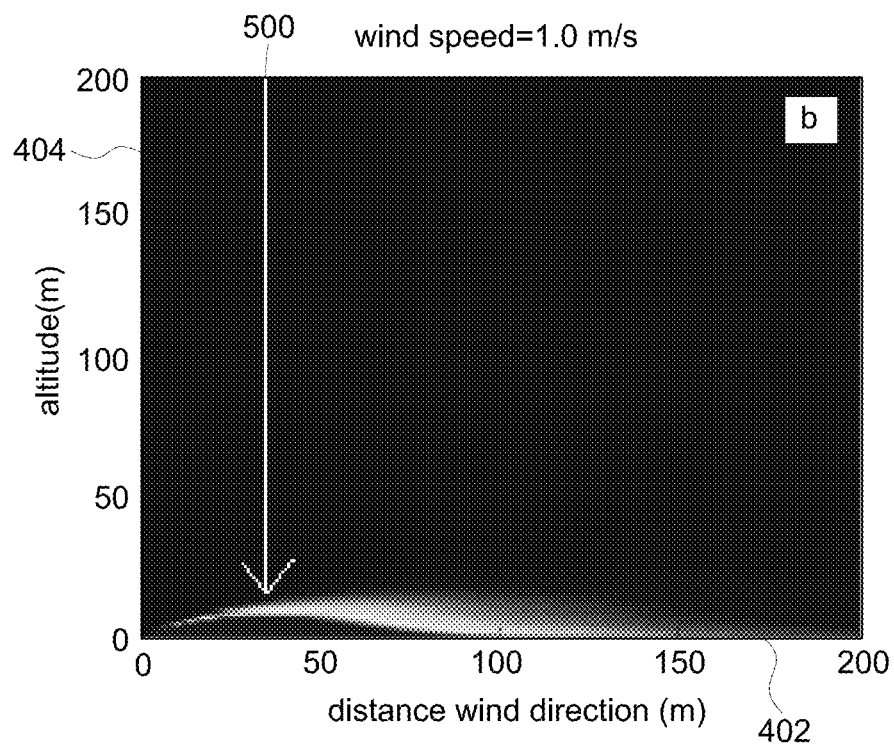
FIG. 9 illustrates another altitude spread model of plumes, or spatial spreads, of a leak of a fluid of interest according to one example.
Figure 10:
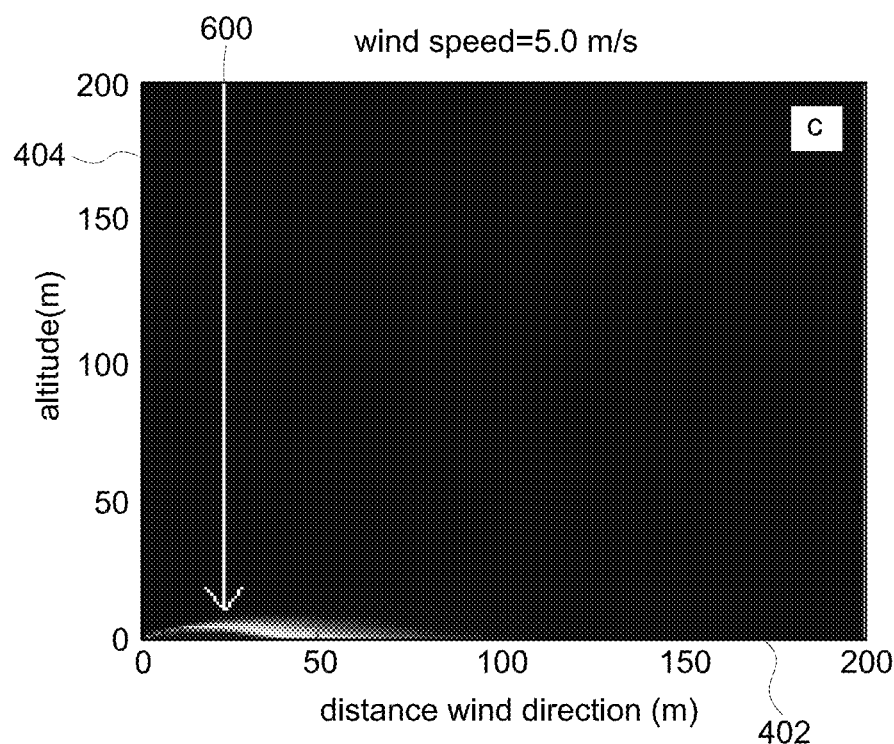
FIG. 10 illustrates another altitude spread model of plumes, or spatial spreads, of a leak of a fluid of interest according to one example.
Figure 11:
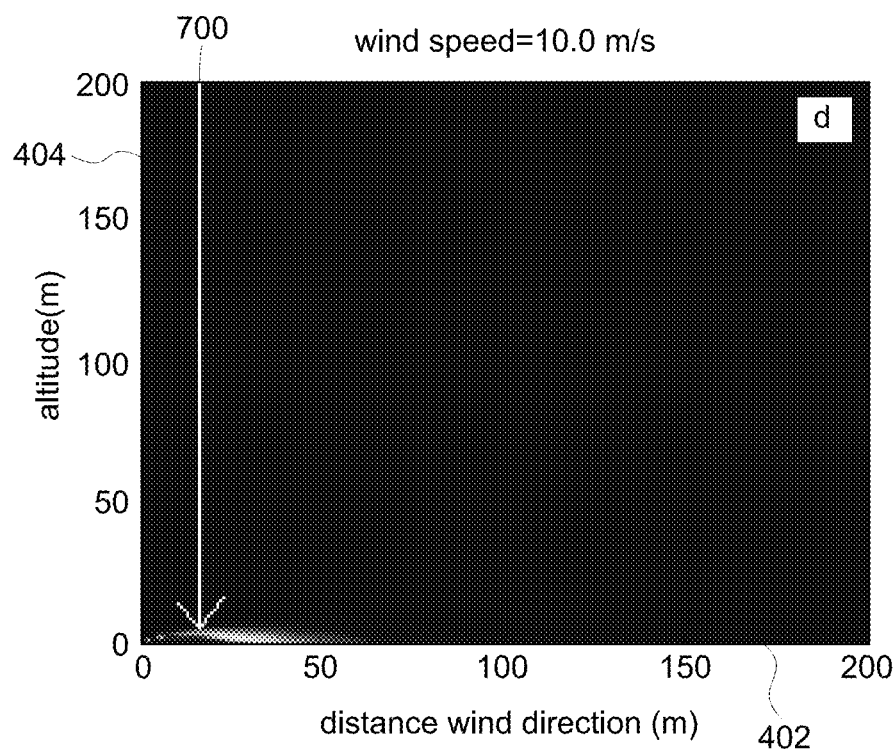
FIG. 11 illustrates another altitude spread model of plumes, or spatial spreads, of a leak of a fluid of interest according to one example.
Figure 12:
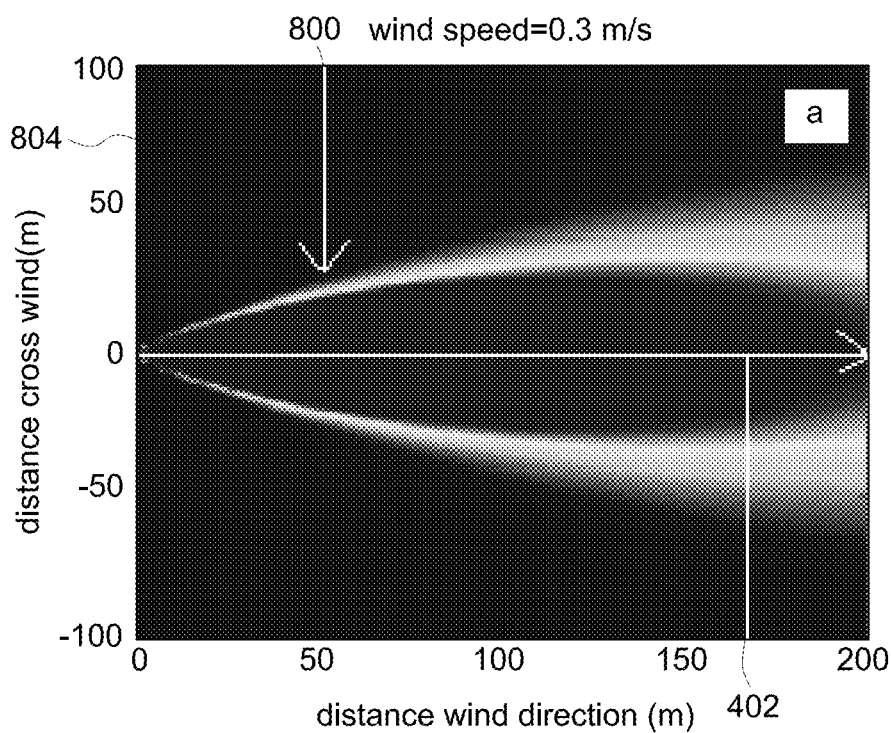
FIG. 12 illustrates a transverse spread model of the plumes, or spreads, of the leak of the fluid of interest according to one example.
Figure 13:
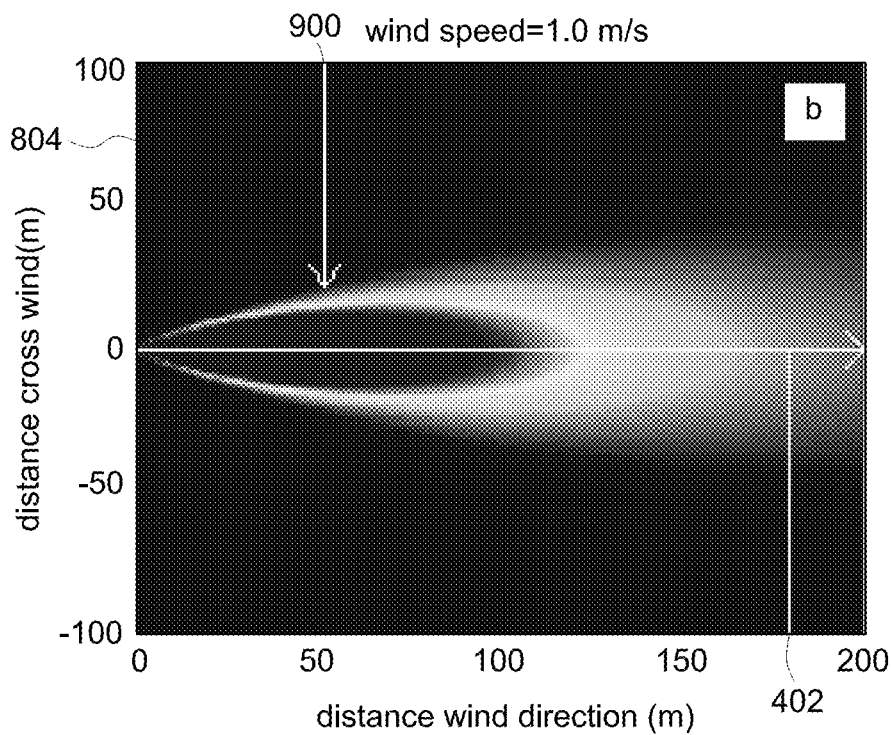
FIG. 13 illustrates a transverse spread model of the plumes, or spreads, of the leak of the fluid of interest according to one example.
Figure 14:
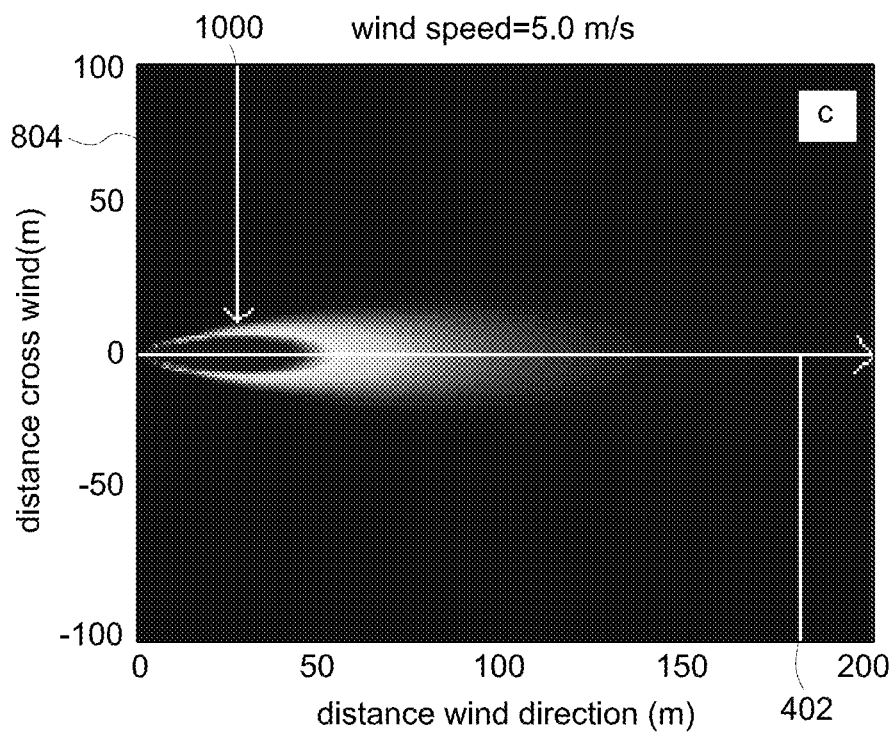
FIG. 14 illustrates a transverse spread model of the plumes, or spreads, of the leak of the fluid of interest according to one example.
Figure 15:
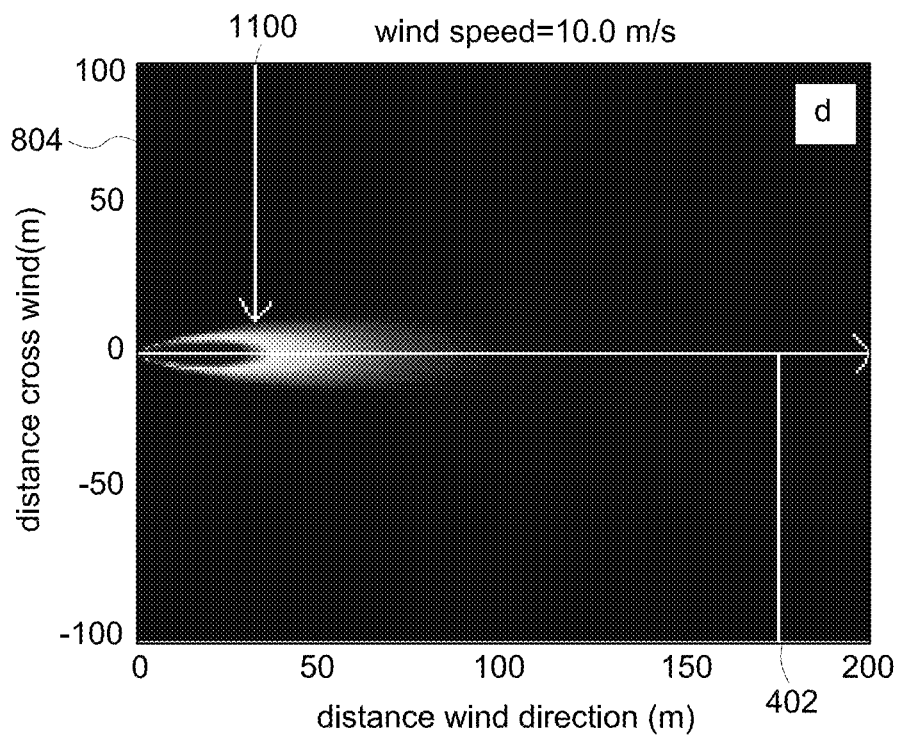
FIG. 15 illustrates a transverse spread model of the plumes, or spreads, of the leak of the fluid of interest according to one example.
Figure 16:
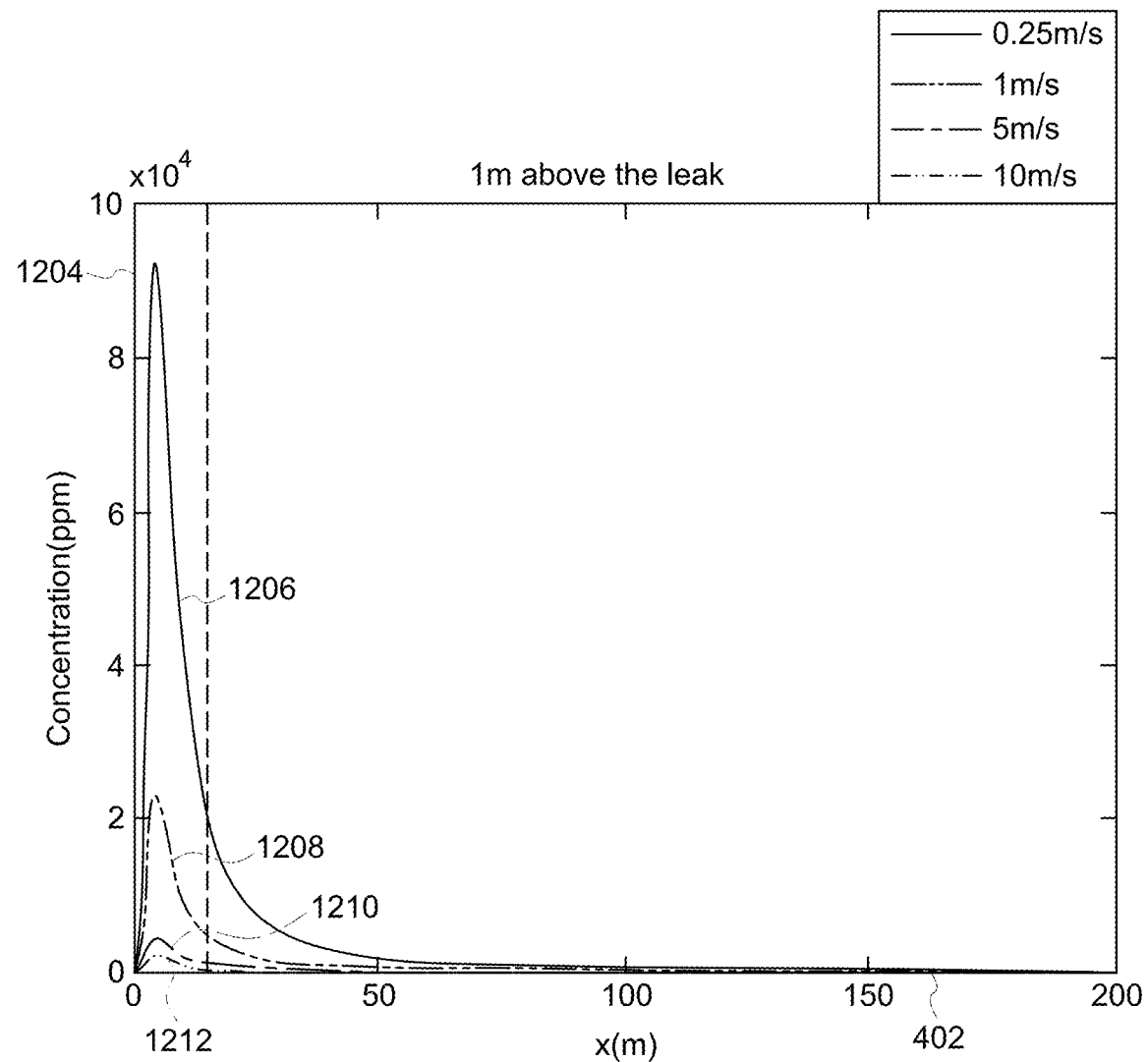
FIG. 16 illustrates concentration spread models of the plumes, or spreads, of the leak of the fluid of interest according to one example.
Figure 17:
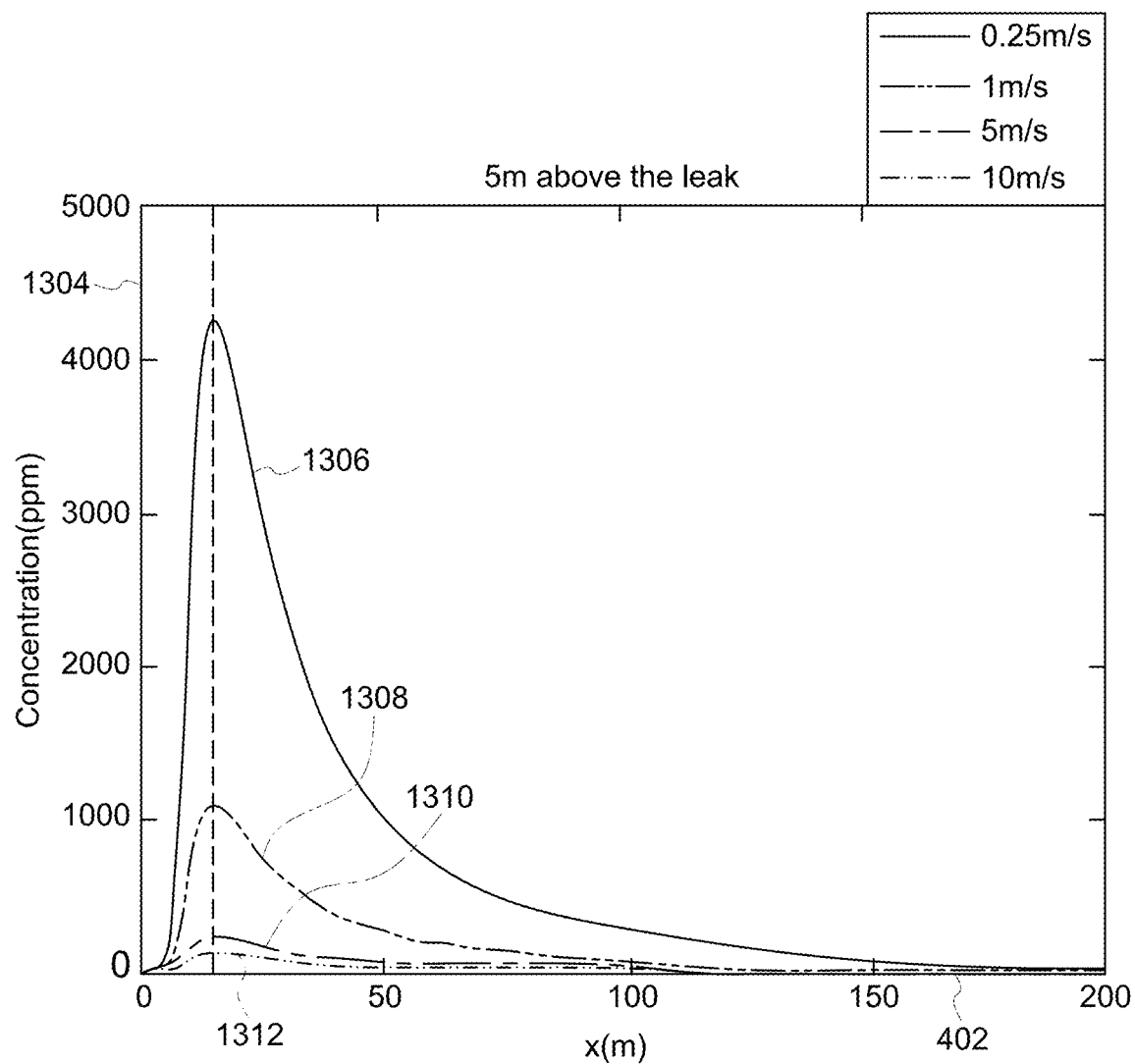
FIG. 17 illustrates concentration spread models of the plumes, or spreads, of the leak of the fluid of interest according to one example.
Figure 18:
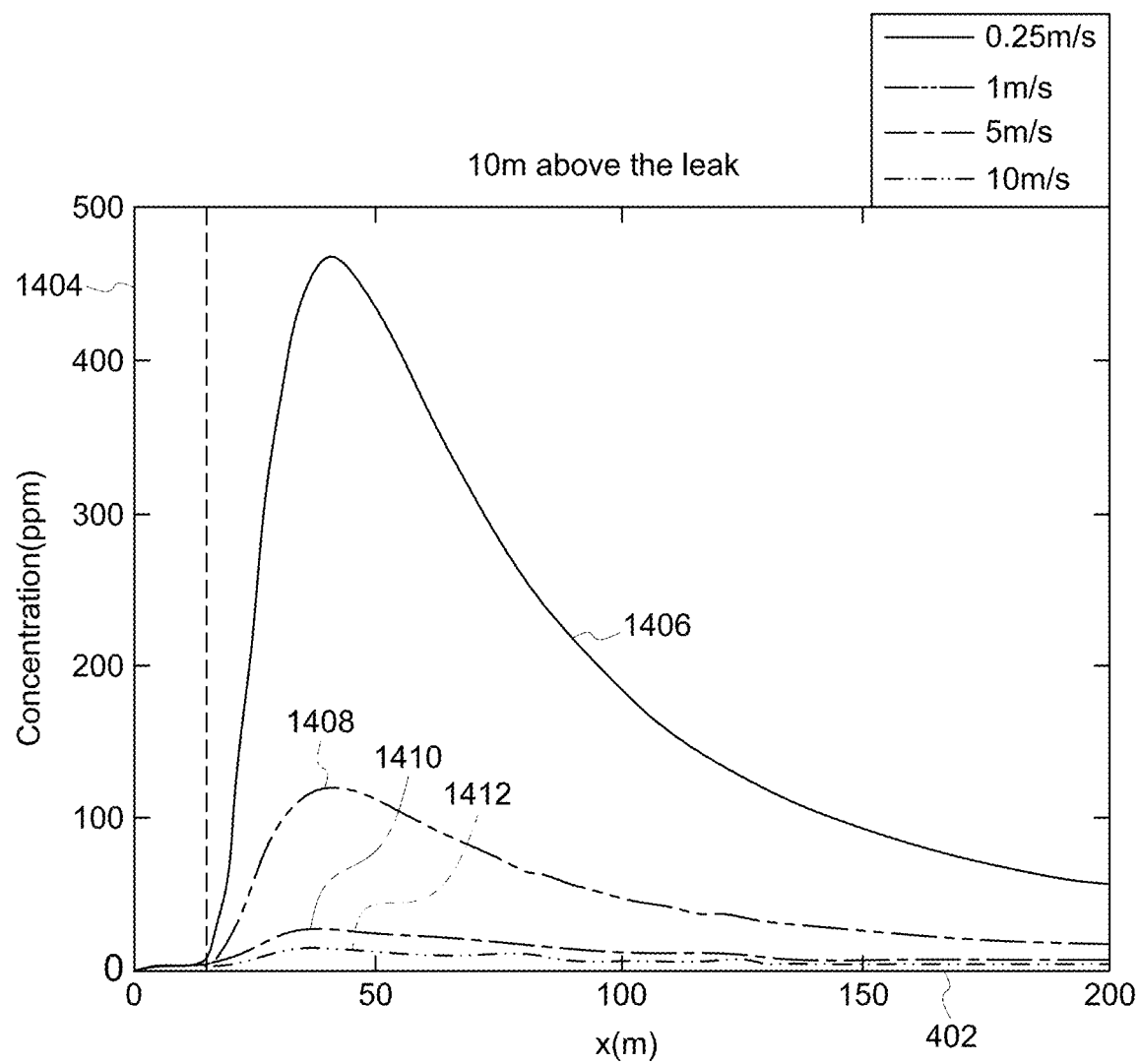
FIG. 18 illustrates concentration spread models of the plumes, or spreads, of the leak of the fluid of interest according to one example.
Figure 19:
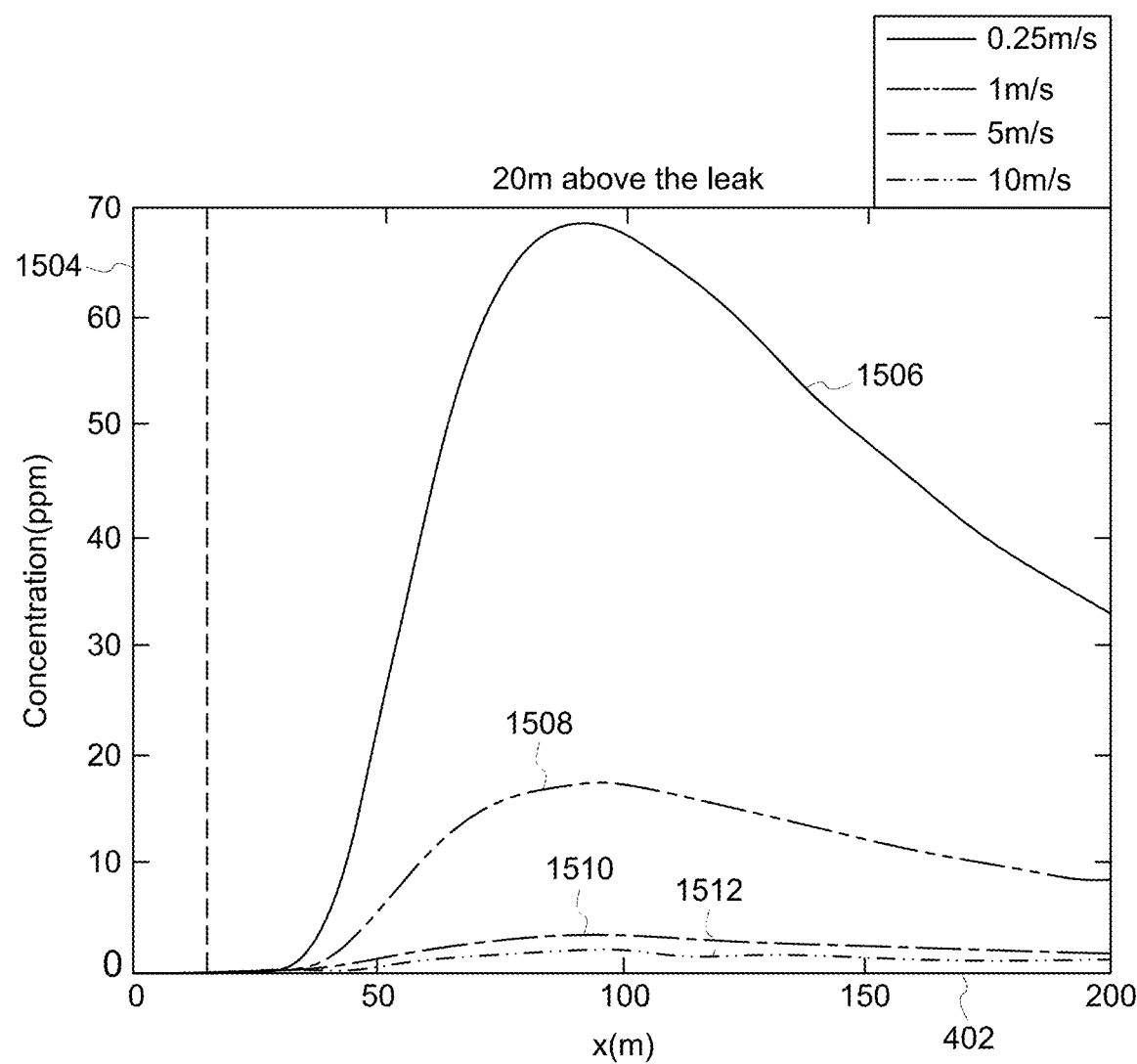
FIG. 19 illustrates concentration spread models of the plumes, or spreads, of the leak of the fluid of interest according to one example.

FIG. 7 illustrates one embodiment of the detection system 112 shown in FIG. 1. The detection system 112 includes an input device 700 ("Input" in FIG. 7) that includes hardware transceiving or receiving circuitry that receives the decreases in light intensity measured by the light sensor 104, associated locations, and/or the ambient conditions sensed by the ambient sensors 604. The input device 700 can include an antenna, modem, and the like, for wirelessly receiving this information during movement of the vehicle 102. Optionally, the input device 700 can represent a conductive connection, such as a connector, that is connected with the mobile sensing system 116 by one or more wired connections.

One or more analysis processors 702 ("Analysis Processor" in FIG. 7) of the detection system 112 represent hardware circuitry that includes and/or is connected with one or more processors (e.g., one or more microprocessors, field programmable gate arrays, and/or integrated circuits). This circuitry and processors can examine the changes in light intensity, associated locations, and/or ambient conditions received from the sensing system 116 (shown in FIG. 1) to identify leaks of the fluid of interest and quantify the leaks.

In one embodiment, the analysis processor 702 examines the information received from the sensing system 116 and compares the information to models of plumes or other shapes that the fluid of interest may form in various ambient conditions. Using this information, the analysis processor 702 can determine which model matches or more closely matches the information obtained from the sensing system 116 than one or more (or all) other models. The matching or more closely matching model or models can then be used by the analysis processor 702 to determine the location of a source of the leak and/or the amount of the fluid of interest in the leak (e.g., the rate at which the fluid is escaping a pipe via the source of the leak).

For example, gas pipelines are installed either above ground or below ground. In order to study plume dynamics pipeline above ground is considered. The analysis processor 702 can simulate or model a plume of a leaking fluid of interest (e.g., methane) using a Gaussian dispersion model for emission from a point source. The concentration of the fluid of interest (e.g., methane) at a geographic location x, y, z can be simulated or modeled by the analysis processor 702 by the following relationship:

$$C(x, y, z) = \frac{Q}{2\pi v \sigma_y \sigma_z} e^{-\frac{y^2}{2\sigma_y^2}} \left( e^{-\frac{(z-h)^2}{2\sigma_z^2}} + e^{-\frac{(z-h)^2}{2\sigma_z^2}} \right)$$

where Q represents the rate of leak of the fluid of interest in terms of grams per second, wind is blowing in the direction of x (along a direction that is perpendicular to both the y and z directions), v is the wind speed in the direction of x, h is the height (e.g., altitude) of the source of the fluid leak, $\sigma_y$ is an atmospheric dispersion coefficient in the direction of y (e.g., a direction that is perpendicular to both the x and the z directions), $\sigma_z$ is an atmospheric dispersion coefficient in the direction of y (e.g., a direction that is perpendicular to both the x and the y directions), and z is the height above ground (e.g., altitude).

The atmospheric dispersion coefficients can be determined by the analysis processor 702 using a Pasquill stability factor D and one or more of the following relationships:

$$\sigma_y = k_1 x \left(1 + \frac{x}{k_2}\right)^{k_3}$$

$$\sigma_z = k_4 x \left(1 + \frac{x}{k_2}\right)^{k_5}$$

the values of $k_1$, $k_2$, $k_3$, $k_4$, and/or $k_5$ can be set or changed by an operator of the sensing system 100. In one embodiment, the values are $k_1 = 0.0787$, $k_2 = 707$, $k_3 = 0.135$, $k_4 = 0.0475$, and $k_5 = 0.465$.

FIGS. 8 through 11 illustrate altitude spread models 400, 500, 600, 700 of plumes, or spreads, of a leak 108 (shown in FIG. 1) of the fluid of interest according to several examples. The models 400, 500, 600, 700 simulate how much a leak 108 of the fluid of interest will spread out vertically (e.g., in terms of altitude) from the source of the leak 108 under different wind speed conditions. The models 400, 500, 600, 700 are shown alongside a horizontal axis 402 representative of distance from the source of the leak 108 along a direction in which wind is moving and a vertical axis 404 representative of altitude (e.g., height) above the source of the leak 108. The models 400, 500, 600, 700 were generated by the analysis processor 702 using the equations described above in order to determine the shape of the spread or plume of the fluid of interest in the leak 108 under different wind conditions. In the illustrated examples, the wind speed for the model 400 is 0.3 meters per second (m/s), the wind speed for the model 500 is 1.0 m/s, the wind speed for the model 600 is 5.0 m/s, and the wind speed for the model 700 is 10.0 m/s. The direction of the wind in each of the models 400, 500, 600, 700 is along or parallel to the horizontal axis 402. It can be seen from the models 400, 500, 600, 700 that as the wind speed increases, the fluid (e.g., methane) leaking (e.g., from a pipe) disperses more quickly and the concentration falls of more quickly with increasing altitude. In the models 400, 500, 600, 700, darker colors closer to the horizontal axis 402 indicate higher concentrations of the fluid of interest while lighter colors farther from the horizontal axis 402 indicate lower concentrations of the fluid of interest.

FIGS. 12 through 15 illustrate transverse spread models 800, 900, 1000, 1100 of the plumes, or spreads, of the leak 108 (shown in FIG. 1) of the fluid of interest according to several examples. The models 800, 900, 1000, 1100 illustrate how the plumes in the corresponding models 400, 500, 600, 700 spread in directions that are transverse (e.g., perpendicular) to the altitude directions indicated in the models 400, 500, 600, 700.

The models 800, 900, 1000, 1100 are shown alongside the horizontal axis 402 representative of distance from the source of the leak 108 along a direction in which wind is moving and a vertical axis 804 representative of distances that are transverse (e.g., perpendicular) to the direction of the wind. The models 800, 900, 1000, 1100 were generated using the equations described above by the analysis processor 702 in order to determine the shape of the spread or plume of the fluid of interest in the leak 108 under different wind conditions. In the illustrated examples, the wind speed for the model 800 is 0.3 meters per second (m/s), the wind speed for the model 900 is 1.0 m/s, the wind speed for the model 1000 is 5.0 m/s, and the wind speed for the model 1100 is 10.0 m/s. The direction of the wind in each of the models 800, 900, 1000, 1100 is along or parallel to the horizontal axis 402. It can be seen from the models 800, 900, 1000, 1100 that, as the wind speed increases, the plume of the fluid of interest is concentrated more along the direction of wind and less along the cross- or transverse-wind directions. For wind speed of 0.3 m/s, the spread of the plume is ~200 meters (m) along they direction at a distance of 200 m along the wind direction, but for a wind speed of 10 m/s, the spread of the plume in the y direction is ~120 m at a distance of 200 m along the wind direction. In the models 800, 900, 1000, 1100, darker colors closer to the horizontal axis 402 indicate higher concentrations of the fluid of interest while lighter colors farther from the horizontal axis 402 indicate lower concentrations of the fluid of interest.

FIGS. 16 through 19 illustrate concentration spread models 1206, 1208, 1210, 1212, 1306, 1308, 1310, 1312, 1406, 1408, 1410, 1412, 1506, 1508, 1510, 1512 of the plumes, or spreads, of the leak 108 (shown in FIG. 1) of the fluid of interest according to several examples. The models 1206, 1208, 1210, 1212, 1306, 1308, 1310, 1312, 1406, 1408, 1410, 1412, 1506, 1508, 1510, 1512 illustrate how the concentration of the fluid of interest in the plumes of the corresponding models 400, 500, 500, 600 change along the direction of the wind for various wind speeds and at various heights (e.g., altitudes) above the source of the leak 108.

The models 1206, 1208, 1210, 1212, 1306, 1308, 1310, 1312, 1406, 1408, 1410, 1412, 1506, 1508, 1510, 1512 are shown alongside the horizontal axis 402 representative of distance from the source of the leak 108 along a direction in which wind is moving and vertical axes 1204, 1304, 1404, 1504 representative of concentrations of the fluid of interest at the different distances along the direction of the wind. The models 1206, 1306, 1406, 1506 represent the concentrations of the fluid of interest at a wind speed of 0.25 m/s, the models 1208, 1308, 1408, 1508 represent the concentrations of the fluid of interest at a wind speed of 1 m/s, the models 1210, 1310, 1410, 1510 represent the concentrations of the fluid of interest at a wind speed of 5 m/s, and the models 1212, 1312, 1412, 1512 represent the concentrations of the fluid of interest at a wind speed of 10 m/s.

The models 1206, 1208, 1210, 1212, 1306, 1308, 1310, 1312, 1406, 1408, 1410, 1412, 1506, 1508, 1510, 1512 were generated using the equations described above by the analysis processor 702 in order to determine the shape of the spread or plume of the fluid of interest in the leak 108 at different altitudes and under different wind conditions. The dashed lines represent a potential right of way half width (~15 m). It can be seen from the models 1206, 1208, 1210, 1212, 1306, 1308, 1310, 1312, 1406, 1408, 1410, 1412, 1506, 1508, 1510, 1512 that, as the height increases from the source of the leak (e.g., the opening in a pipeline), the location of the peak concentration moves along the direction of the wind. At a height of 5 m, the plume has almost moved away from a 30 m wide right of way (15 m from the leak location or pipeline). It can also be seen that the peak value of concentration drops significantly with height. According to the models 1206, 1306, 1406, 1506, for a wind speed of 0.25 m/s the peak concentration falls from ~200,000 parts per million (ppm) to ~70 ppm as the altitude above the source of the leak (e.g., the pipeline) changes from 1 m to 20 m. According to the models 1206, 1208, 1210, 1212, 1306, 1308, 1310, 1312, 1406, 1408, 1410, 1412, 1506, 1508, 1510, 1512, in order to detect a 0.1% leak rate (~20 cubic feet per second) of methane with a wind speed of 10 m/s blowing across the right of way, the sensor 104 needs to detect 100 ppm of methane. Furthermore, if the sensor 104 needs to be confined within the right of way, the height or altitude of the vehicle 102 and sensor 104 should be less than or equal to 5 m in one embodiment.

Figure 20:
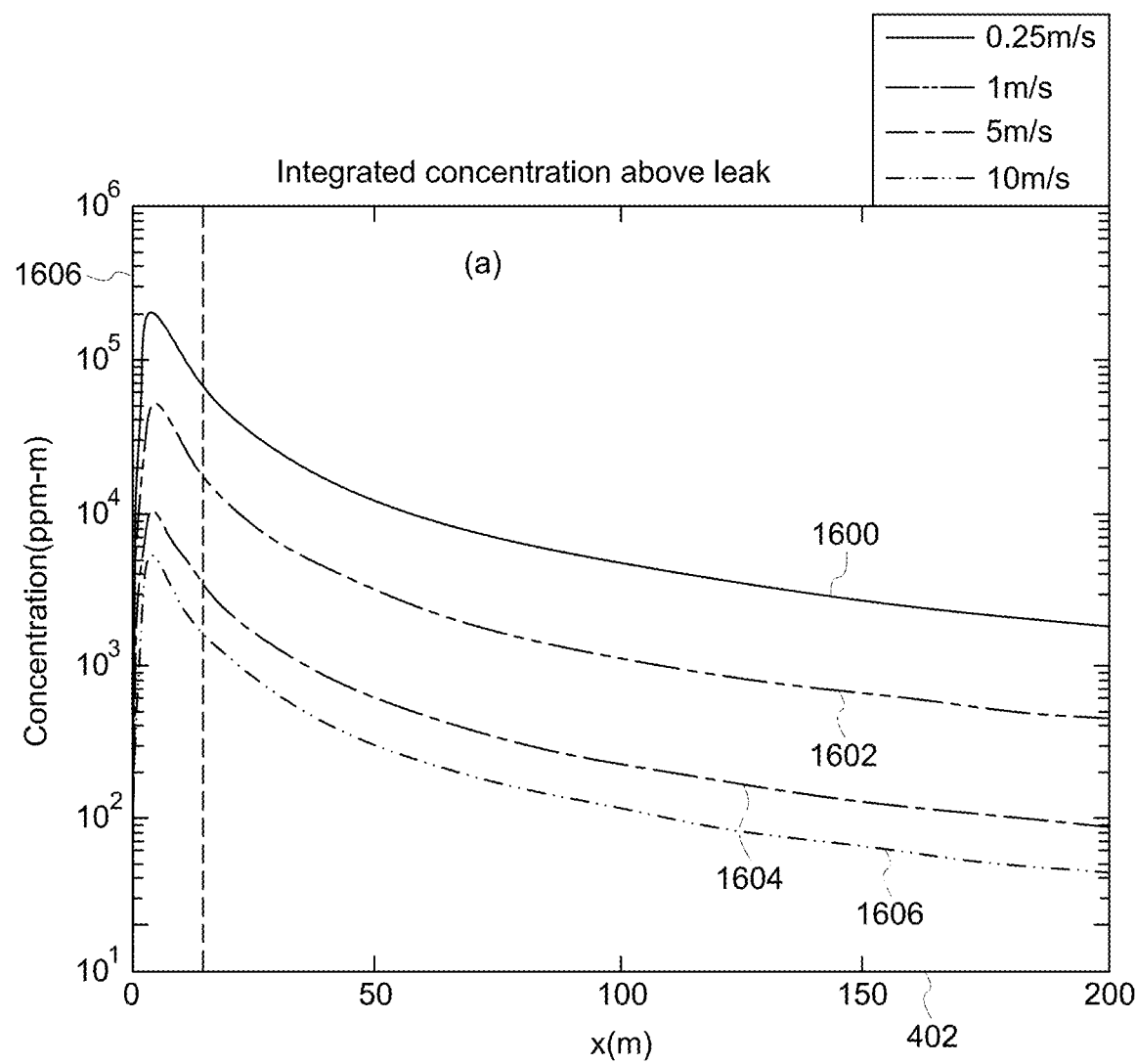
FIG. 20 illustrates models of integrated concentrations of the fluid of interest (e.g., methane) as a function of distance along the wind direction according to one example.

FIG. 20 illustrates models 1600, 1602, 1604, 1606 of integrated concentrations of the fluid of interest (e.g., methane) as a function of distance along the wind direction according to one example. The models 1600, 1602, 1604, 1606 are shown alongside the horizontal axis 402 described above and a vertical axis 1608 representative of concentration of the fluid of interest. Each of the models 1600, 1602, 1604, 1606 is representative of a different wind speed. The models 1600, 1602, 1604, 1606 were created by the analysis processor 702 using the equations described above.

The dashed line corresponds to the half width of right way (~15 m). For a wind speed of 0.25 m/s, the concentration drops from ~200,000 ppm-m to ~80,000 ppm-m as the distance along the wind direction increases to 15 m. For a wind speed of 10 m/s, the concentration drops from ~5,000 ppm-m to ~2,000 ppm-m as the distance along the wind direction increases to 15 m.

Figure 21:
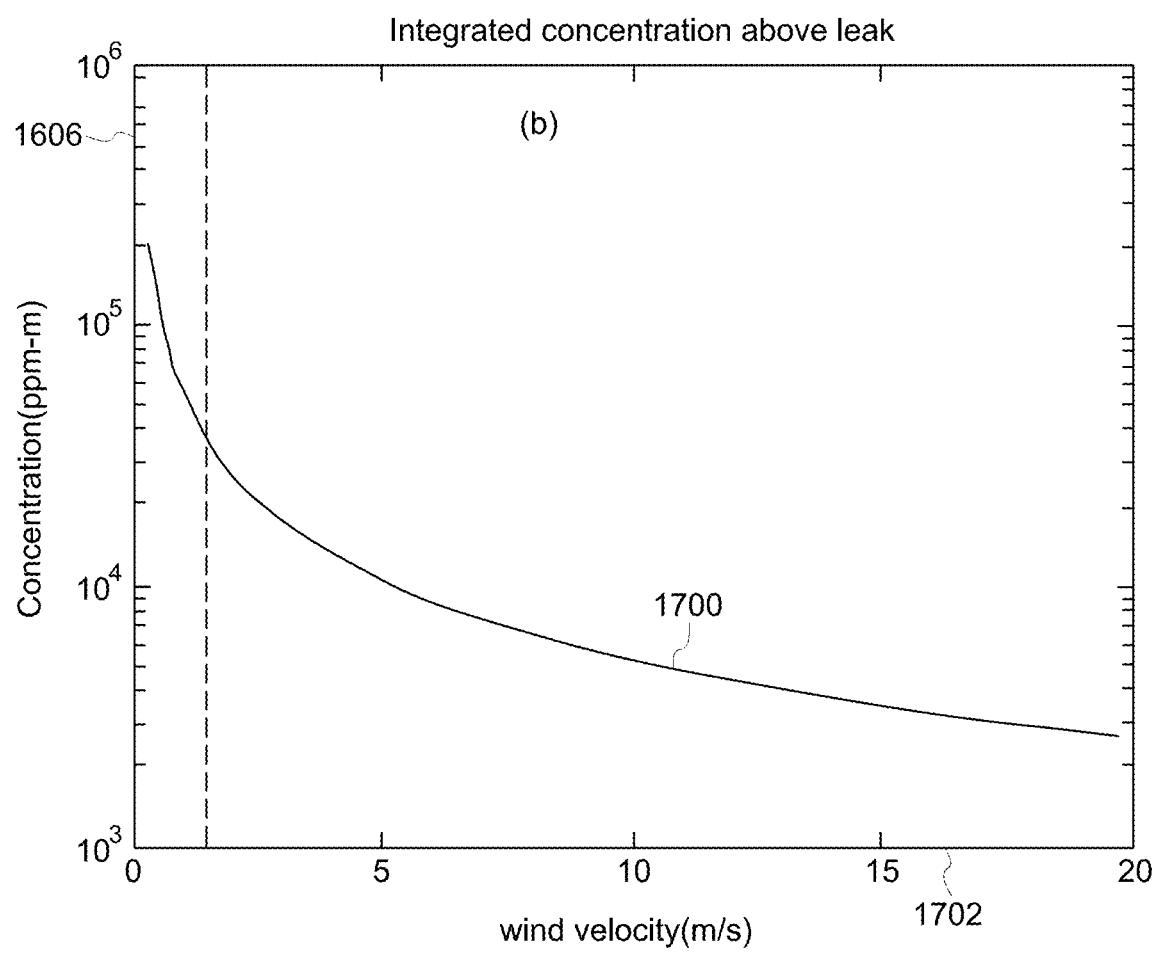
FIG. 21 illustrates a model of a maximum or upper limit on the integrated concentration of the fluid of interest (e.g., methane) as a function of wind speed according to one example.

FIG. 21 illustrates a model 1700 of a maximum or upper limit on the integrated concentration of the fluid of interest (e.g., methane) as a function of wind speed according to one example. The model 1700 is shown alongside a horizontal axis 1702 representative of wind speed and the vertical axis 1606 described above. The model 1700 was created by the analysis processor 702 using the equations described above. The model 1700 illustrates the effect of wind speed on the maximum or upper limit on integrated methane concentration in the plume. As the wind speed increases from 0.25 m/s to 20 m/s, the concentration of the fluid of interest (e.g., methane) drops from 200,000 ppm-m to ~3,000 ppm-m. In order to detect a leak rate of 0.1% of flow (~20 cubic ft/s) with a wind speed of 10 m/s blowing across the right of way, the sensor 104 needs to detect ~2,000 ppm-m, provided the detection is confined within the right of way (less than 15 m from the pipeline) and is pointed towards the direction of the wind from the leak location, according to one embodiment.

The different models shown and described herein can represent how the concentration of the fluid of interest changes in different directions under different wind speeds. These models can be associated with the same ambient temperature and atmospheric pressure. But, a different set of these models can be created by the analysis processor 702 for each combination of different temperatures and/or different pressures. The processor 702 can generate several different sets of these models, with each set having models generated for a designated wind speed, a designated direction of the wind, a designated temperature, and/or a designated atmospheric pressure. Additionally, different sets of these models may be associated with different amounts of the fluid of interest, such as different rates at which the fluid is leaking from the source of the leak 108.

The analysis processor 702 can obtain the measurements of the decrease in intensity of the light 106, 110 (as detected by the sensor 104) and the associated locations of the measurements, and associate different intensity decreases with different concentrations of the fluid of interest. For example, the analysis processor 702 can refer to a look up table or other memory structure in a memory 304 that associates different changes in light intensity with different concentrations of the fluid of interest. This associated can be obtained from previous measurements of changes in the light intensity for known concentrations of the fluid of interest. The memory 304 can represent one or more computer hard drives, optical drives, flash drives, or the like.

The analysis processor 702 can select one or more sets of models to examine based on the ambient conditions. For example, the analysis processor 702 can select multiple sets of the models described above and shown herein that are associated with the ambient temperature, atmospheric pressure, wind speed, and/or wind direction as measured by the ambient sensor(s) 204. Each set of the models may be associated with a different amount of the fluid of interest leaking from the source of the leak (e.g., different leak rates).

The analysis processor 702 can compare the locations of the measured concentrations of the fluid of interest with the shapes of the modeled plumes and/or the concentrations of the fluid of interest represented by the modeled plumes at different locations in the models within each of the selected sets of models. The analysis processor 702 can compare the shapes of the measured concentrations of the fluid of interest with the models in the selected sets to determine if the shape of one or more of the models matches or more closely matches the shapes of the measured concentrations (e.g., than one or more, or all other, models). The set of models that more closely matches the shape of the measured concentrations may be identified as the set of models that is representative of the leak 108 of the fluid of interest.

The analysis processor 702 can then determine the location and/or the amount of the fluid of interest in the leak 108 (e.g., the rate at which the fluid is leaking) based on the identified set of models. As described above, different sets of the models can be associated with different amounts (e.g., leakage rates) of the fluid of interest. The leak rate or amount of the fluid associated with the identified set of models can be identified by the analysis processor 702 as the leak rate or amount of the fluid represented by the measured concentrations. Additionally, the analysis processor 702 can identify the location of the source of the leak 108 based on the identified set of models. For example, the analysis processor 702 can overlay the identified set of models onto the locations of the measured concentrations to determine where the intersection of the horizontal and vertical axes of the models in the identified set is located. This location can be the location of the source of the leak.

The analysis processor 702 can generate a reporting signal that is communicated to an output device 306, such as a display device, a speaker, a touchscreen, etc. This reporting signal may direct the output device 306 to visually and/or audibly notify an operator of the identified location and the identified amount of the leak 108. Optionally, the reporting signal can be communicated to equipment that automatically closes a valve or otherwise stops the flow of the fluid of interest through the pipe or other conduit in which the leak is identified.

Figure 22:
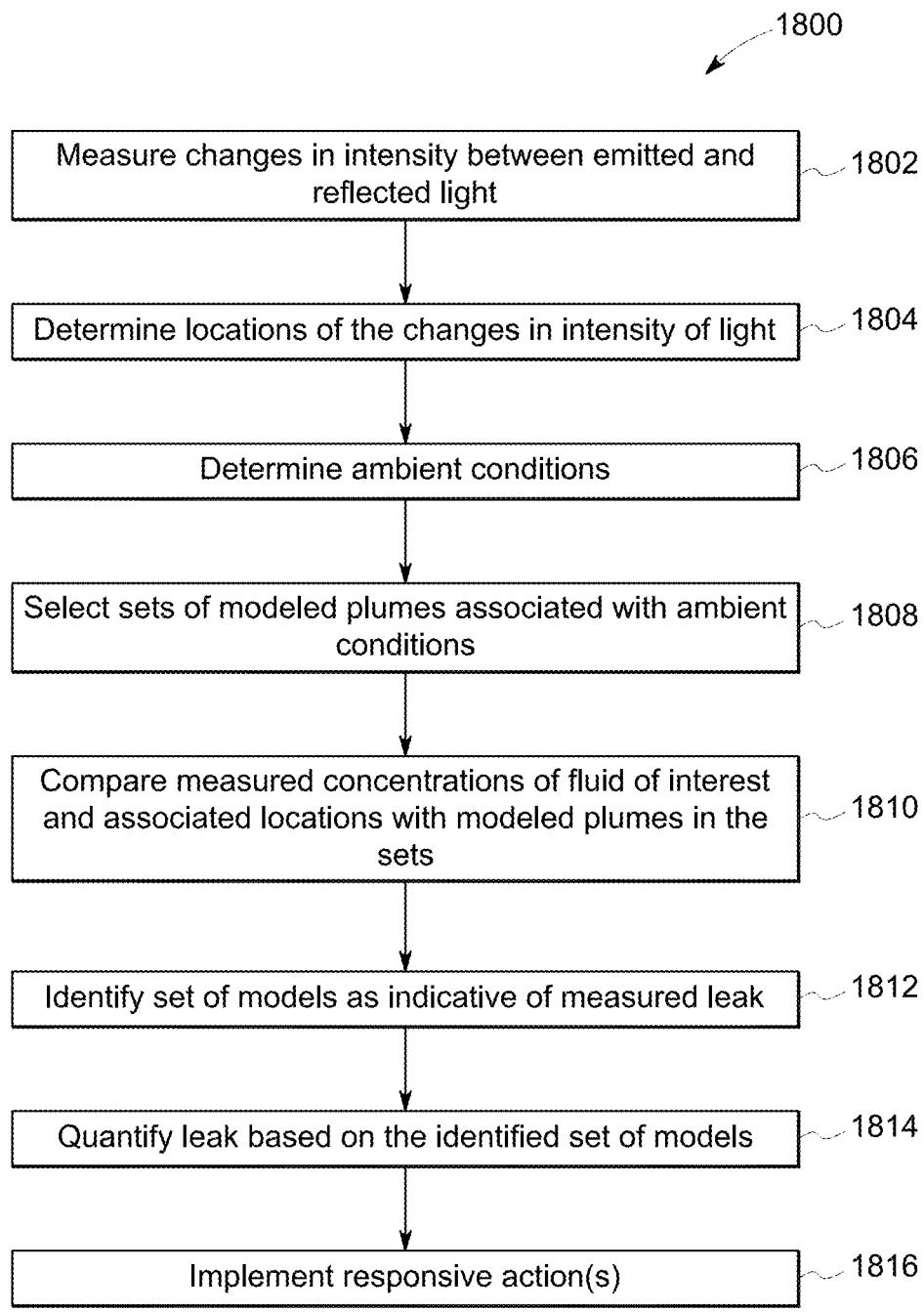
FIG. 22 illustrates a flowchart of one embodiment of a method for quantifying a leak of a fluid of interest.

FIG. 22 illustrates a flowchart of one embodiment of a method 1800 for quantifying a leak of a fluid of interest. The method 1800 may be performed by the sensing system 100 described above. For example, the method 1800 can represent operations performed by the sensing system 100 and/or can represent an algorithm used to create one or more software applications that direct the operations of the sensing system 100.

At 1802, changes in intensity in light having a wavelength tuned to absorption of the fluid of interest are determined. These changes in intensity can be measured between a laser light emitted toward a location and the light reflected back to a sensor, as described above. At 1804, locations where these changes are measured are determined. At 1806, the ambient conditions in which the intensity changes were measured are determined. For example, the wind speed, wind direction, temperature, atmospheric pressure, etc., in which the changes in light intensity were measured can be determined.

At 1808, sets of modeled plumes of the fluid of interest are selected for examination. The sets can be selected from a larger group of sets based on the ambient conditions that were determined. For example, each set of modeled plumes can be associated with a different combination of ambient conditions. The set or sets of modeled plumes associated with the ambient conditions that matches (or more closely matches) the ambient conditions during which the changes in light intensity were measured may be selected for examination.

At 1810, concentrations of the fluid of interest based on the measured changes in light intensity and the locations where the changes in light intensity were measured are compared to the modeled plumes in the different sets of the selected sets. At 1812, a set of the modeled plumes in the selected sets is identified. This set can be identified by determining which modeled plume or plumes in the selected sets matches or more closely matches the shape formed by the measured concentrations and the associated locations.

At 1814, the leak is quantified based on the identified set of models. The different sets of modeled plumes can be associated with different leak rates or amounts of the fluid of interest. Depending on which set of the modeled plumes is identified as matching or more closely matching the shape formed by the measured concentrations and the associated locations, the associated leak rate or amount of fluid can be determined. Additionally, the location of the leak can be identified based on the location of the leak in the modeled plumes in the identified set. For example, the modeled plumes in the identified set may be overlaid on a map of the measured concentrations of the fluid of interest. The intersection of the vertical and horizontal axes in the modeled plumes in the identified set can represent the location of the leak.

At 1816, one or more responsive actions can be implemented. These actions can include reporting the location and/or amount of the fluid in the leak, automatically closing a valve to stop the flow of the fluid of interest, or the like.

In one embodiment of the sensing systems described herein, the mobile sensing systems can obtain or sense information indicative of locations of where the fluid or analyte of interest is measured. For example, the remote sensor 104 of the sensing system 116 can emit different wavelengths of light for different measurements. A first wavelength of laser light emitted from the remote sensor 104 toward the ground or area 114 being examined can be used for detecting the presence and/or amount of a fluid or analyte of interest (as described above). A different, second wavelength of laser light emitted from the remote sensor 104 toward the ground or area 114 being examined can be used for determining topographical information about the ground or area 114 being examined. The second wavelength of light can be a wavelength that is not absorbed by the fluid or analyte of interest or that is absorbed significantly less than the first wavelength (such as absorbed at least 50% less than the first wavelength). The second wavelength can be used to determine how far the ground or area 114 is from the sensor 104, similar to a LiDAR system. For example, the second wavelength can be reflected off the ground and the reflection detected by a photodetector of the sensor 104. The time period between emission of the second wavelength and detection of the reflection of the second wavelength by the sensor 104 can be determined and used to calculate the distance between the sensor 104 and the ground (similar or identical to a LiDAR system). Optionally, detection of reflections of the second wavelength of light can be used to generate an image of the ground.

The sensor 104 can alternate, or blink, between these different wavelengths of light. For example, the sensor 104 can emit a pulse of the first wavelength of light toward the ground and detect the reflection of the first wavelength of light to determine how much of the fluid of interest is in the path of the first wavelength of light. Then, the sensor 104 can emit a pulse of the second wavelength of light toward the ground and detect reflection of the second wavelength of light to determine how far the ground is from the sensor 104 and/or to form at least part of an image of the ground. The sensor 104 can alternate between emitting the pulses of different wavelengths of light to both measure amounts of the fluid or analyte of interest and determine changes in topography or images of the ground. The changes in topography can be determined by identifying differences in distances between the sensor 104 and the ground at different locations. The mobile sensing system 102 can include an additional sensor, such as an altimeter, that detects changes in altitude. The changes in distances between the sensor 104 and the ground can be corrected by subtracting out the changes in the altitude of the system 102 in order to measure changes in topography in different locations where the sensor 104 measures the concentrations or presence of the analyte or fluid of interest. Based on these measurements, the system 102 and/or system 112 can generate topographical maps on which or over which an indicium or indicia indicative of locations where the analyte or fluid of interest was measured can be shown.

Figure 23:
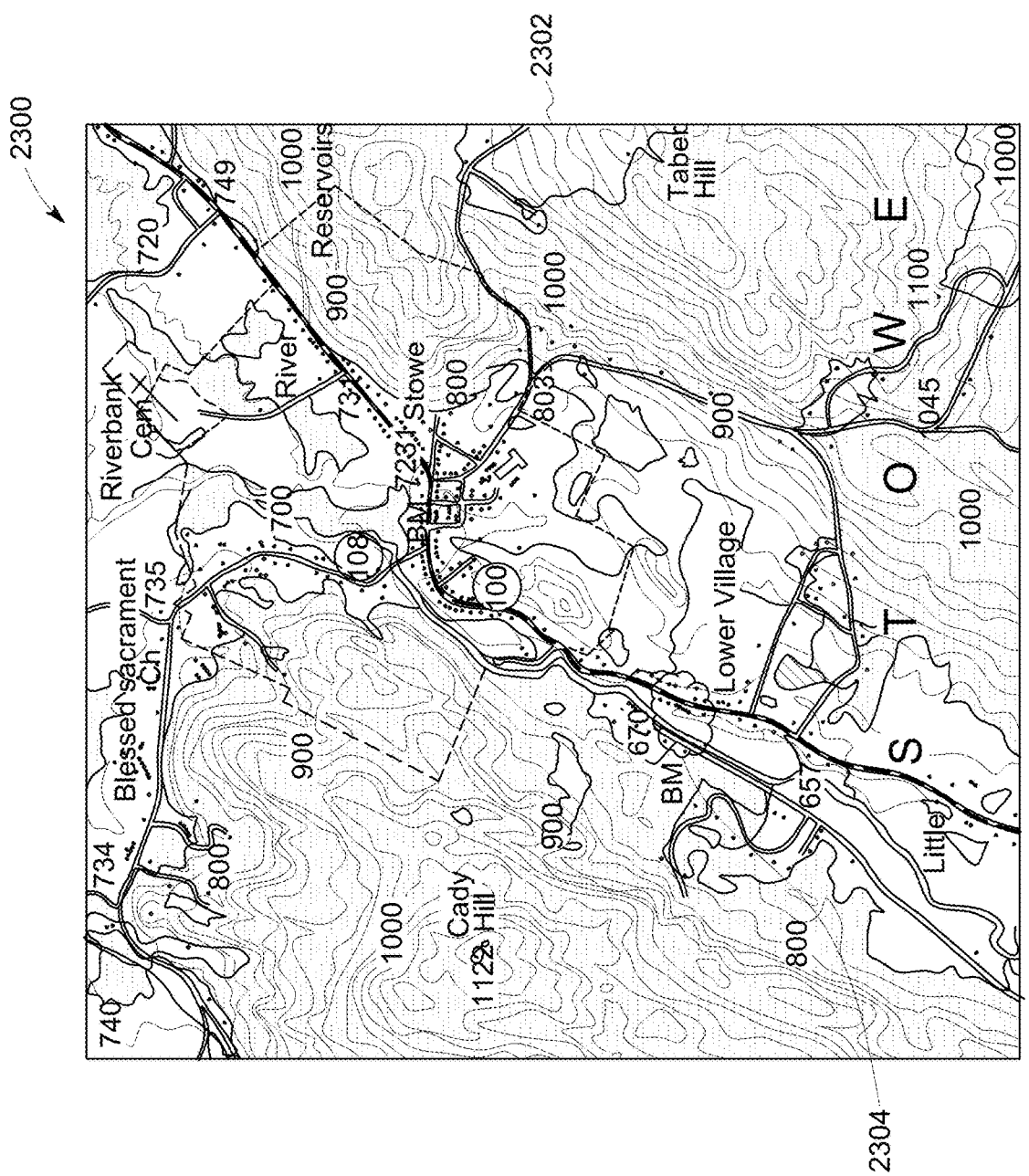
FIG. 23 illustrates one example of a composite map that can be generated using the mobile sensing systems described herein according to one embodiment.

FIG. 23 illustrates one example of a composite map 2300 that can be generated using the mobile sensing systems described herein according to one embodiment. The map 2300 includes a topographical map 2302 that can be generated, at least in part, on the changes in distance between the system 102 and the ground during a time that the sensor 104 on the system 102 also is measuring concentrations of an analyte or fluid of interest. The map 2302 also includes an indicium 2304 representing where concentrations of the analyte of fluid of interest were measured, as described above.

Optionally, one or more of the sensing systems described herein can include a location sensor, such as a global positioning system (GPS) receiver, that determines locations of the system 102 while the sensor 104 obtains measurements of the analyte or fluid of interest. For example, the system 102 can include a GPS receiver that determines geographic coordinates and/or altitudes of the system 102 while the sensor 104 is measuring concentrations of the analyte of interest. The locations of the system 102 during these measurements can be reported to the detection system 112, which can store and/or have access to maps of these locations. Based on the locations of the system 102 at the times when the analyte or fluid of interest is measured by the sensor 104, the detection system 112 can generate composite maps (similar to the map 2300 shown in FIG. 23) to indicate (e.g., to an operator of the systems) where the analyte or fluid of interest was detected. This can assist the operator in identifying where the leak may be located.

In one embodiment, a scanning TDLAS system for producing a path averaged 2D concentration map of a leaking plume is provided. This map optionally is referred to as a path averaged 2D map. The system includes a tunable light source capable of tuning its wavelength over the absorption band of the specimen of interest, a lightweight mirror to scan the light, a lightweight collection optic, an array of detectors to measure reflected light, one or more processors configured to align the scanning with the detected signal and analyze the signal to produce a path averaged 2D concentration map of the leaking plume, the one or more processors configured to use an analytical model of plume dynamics to compare the detected 2D concentration map and calculate leak location and rate, and a flying platform that can fly in a control flight path.

In one example, tunable light source includes one or more of a tunable laser diode whose wavelength can be tuned by either tuning the drive current or the operating temperature or a superluminescent light emitting diode (SLED) whose wavelength can be scanned using filters between the light source and the detector.

In one example, lightweight mirror includes one or more of an MEMS mirror or resonant scanning mirrors whose position can be changed by proving different voltage or current.

In one example, the lightweight collection optic includes a plastic fresnel lens.

In one example, the array of detectors includes one or more PIN photodiodes or avalanche photodiodes, which produce current or voltage proportional to intensity of incident light.

In one example, the one or more processors include one or more DSP chips that provide output signals to drive the laser and the scanning mirror circuit.

In one example, the one or more processors are configured to input the detector output and calculate the 2D concentration map from the input.

In one example, the model includes a plume dynamics model.

In one example, the plume dynamics model is a Gaussian Plume model.

In one example, the model provides an analytical 2D map of the plume dynamics with which the detected 2D map is compared to estimate leak rate and location.

In one example, the flying platform includes one or more of an unmanned aerial vehicle, such as quad copters and fixed wing drones, manned aerial vehicle, such as helicopters and small planes.

In one embodiment, a sensing system includes one or more processors configured to determine measured concentrations of a fluid of interest and locations of the measured concentrations. The one or more processors are configured to compare the measured concentrations and the locations with modeled plumes of a leak of the fluid of interest. The one or more processors also are configured to determine one or more of an amount of the fluid of interest exiting from the leak or a source location of the leak based on comparing the measured concentrations and the locations with modeled plumes of the leak of the fluid of interest.

In one example, different sets of the modeled plumes are associated with different ambient conditions. The one or more processors are configured to determine one or more ambient conditions in which the measured concentrations of the fluid of interest were obtained and to select at least one of the sets of the modeled plumes for comparing to the measured concentrations based on a comparison of the ambient conditions in which the measured concentrations were obtained and the ambient conditions associated with the sets of the modeled plumes.

In one example, the ambient conditions associated with the different sets of the modeled plumes include one or more of temperature, atmospheric pressure, wind direction, or wind speed.

In one example, the different sets of the modeled plumes are associated with different amounts of the fluid of interest exiting the source location of the leak, and the one or more processors are configured to determine the amount of the fluid of interest exiting from the leak based on which of the different sets of the modeled plumes more closely matches the measured concentrations of the fluid of interest and the locations of the measured concentrations.

In one example, the one or more processors are configured to determine the measured concentrations of the fluid of interest from a light sensor disposed onboard an aerial vehicle.

In one example, the modeled plumes represent spatial spreads of the fluid of interest under different ambient conditions.

In one example, the ambient conditions include wind speed.

In one example, the one or more processors are configured to automatically close a valve to stop flow of the fluid of interest responsive to determining the one or more of the amount of the fluid of interest exiting from the leak or the source location of the leak.

In one example, the fluid of interest is methane.

The system optionally can include a light source configured to be disposed onboard an aerial vehicle and to emit a first light at a first wavelength that is at least partially absorbed by the fluid of interest, as well as a light sensitive device configured to detect reflection of the first light. The one or more processors can be configured to determine the measured concentrations of the fluid of interest based on the reflection of the first light that is detected.

In one example, this light source also is configured to emit a different, second light at a different, second wavelength and the light sensitive device also is configured to detect reflection, scatter, or emission when activated by the second light. The one or more processors also can be configured to determine the locations of the measured concentrations based on the reflection, scatter, or emission when activated by the second light.

In one example, one or more processors can be configured to determine a topography of a geographic area where the reflection of the first light is measured as the locations based on the reflection of the second light. In one example, the second light is producing scatter detected by the light sensitive device. In one example, the second light is producing emission such as luminescence emission detected by the light sensitive device.

Optionally, the system also includes a location sensor configured to determine the locations of the measured concentrations. The one or more processors can be configured to generate a composite map that presents the locations of the measured concentrations and the measured concentrations.

Optionally, the one or more processors are configured to automatically activate a response action upon detection of a leak, where the response action is physical response action or digital response action. The physical response action may be in a form of reducing the leak, stopping the leak, or repairing the leak, such as by changing a position of a valve. The digital response action may be in a form of sending a notification message about the detected leak event.

In one example, the light source and the light sensitive device are configured to be scanned together during determination of the measured concentrations.

In one example, the system also can include a moveable mirror configured to reflect the first light in different directions.

In one embodiment, a sensing system includes one or more processors configured to determine measured concentrations of a fluid of interest and locations of the measured concentrations. The one or more processors are configured to compare the measured concentrations and the locations with modeled plumes of a leak of the fluid of interest. Different modeled plumes are associated with different ambient conditions. The one or more processors are configured to determine one or more of an amount of the fluid of interest exiting from the leak or a source location of the leak based on comparing the measured concentrations and the locations with one or more of the modeled plumes of the leak of the fluid of interest associated with the ambient conditions in which the measured concentrations of the fluid were determined.

In one example, the one or more processors are configured to determine one or more ambient conditions in which the measured concentrations of the fluid of interest were obtained and to select at least one of the sets of the modeled plumes for comparing to the measured concentrations based on a comparison of the ambient conditions in which the measured concentrations were obtained and the ambient conditions associated with the sets of the modeled plumes.

In one example, the different sets of the modeled plumes are associated with different amounts of the fluid of interest exiting the source location of the leak, and the one or more processors are configured to determine the amount of the fluid of interest exiting from the leak based on which of the different sets of the modeled plumes more closely matches the measured concentrations of the fluid of interest and the locations of the measured concentrations.

In one example, the ambient conditions associated include one or more of temperature, atmospheric pressure, wind direction, or wind speed.

In one example, the one or more processors are configured to determine the measured concentrations of the fluid of interest from a light sensor disposed onboard an aerial vehicle.

In one example, the modeled plumes represent spatial spreads of the fluid of interest under the different ambient conditions.

In one example, the ambient conditions include wind speed.

In one example, the one or more processors are configured to automatically close a valve to stop flow of the fluid of interest responsive to determining the one or more of the amount of the fluid of interest exiting from the leak or the source location of the leak.

In one example, the fluid of interest is methane.

In one embodiment, a method includes determining measured concentrations of a fluid of interest, determining locations where the measured concentrations were measured, comparing the measured concentrations and the locations with modeled plumes of a leak of the fluid of interest, and determining one or more of an amount of the fluid of interest exiting from the leak or a source location of the leak based on comparing the measured concentrations and the locations with modeled plumes of the leak of the fluid of interest.

In one example, different sets of the modeled plumes are associated with different ambient conditions, and the method also includes determining one or more ambient conditions in which the measured concentrations of the fluid of interest were obtained, and selecting at least one of the sets of the modeled plumes for comparing to the measured concentrations based on a comparison of the ambient conditions in which the measured concentrations were obtained and the ambient conditions associated with the sets of the modeled plumes.

In one example, the ambient conditions associated with the different sets of the modeled plumes include one or more of temperature, atmospheric pressure, wind direction, or wind speed.

In one example, the different sets of the modeled plumes are associated with different amounts of the fluid of interest exiting the source location of the leak, and further the method also includes determining the amount of the fluid of interest exiting from the leak based on which of the different sets of the modeled plumes more closely matches the measured concentrations of the fluid of interest and the locations of the measured concentrations.

In one example, the measured concentrations of the fluid of interest are determined from a light sensor disposed onboard an aerial vehicle.

In one example, the modeled plumes represent spatial spreads of the fluid of interest under different ambient conditions.

In one example, the ambient conditions include wind speed.

In one example, the method also includes automatically closing a valve to stop flow of the fluid of interest responsive to determining the one or more of the amount of the fluid of interest exiting from the leak or the source location of the leak.

In one example, the fluid of interest is methane.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system comprising:
one or more processors configured to determine measured concentrations measured by a vehicle of a fluid of interest and locations of the measured concentrations, the one or more processors configured to compare the measured concentrations and the locations with modeled plumes of a leak of the fluid of interest, the one or more processors configured to determine an amount of the fluid of interest exiting from the leak using a density of the fluid of interest, a wind speed during the measurement, a speed of a vehicle during measurement, the measured concentration of a fluid of interest, and the time period the fluid of interest was measured.

2. The system of claim 1, wherein different sets of the modeled plumes are associated with different ambient conditions, and wherein the one or more processors are configured to determine one or more ambient conditions in which the measured concentrations of the fluid of interest were obtained and to select at least one of the sets of the modeled plumes for comparing to the measured concentrations based on a comparison of the ambient conditions in which the measured concentrations were obtained and the ambient conditions associated with the sets of the modeled plumes.

3. The system of claim 1, wherein the one or more processors are configured to determine the measured concentrations of the fluid of interest from a light sensor disposed onboard the aerial vehicle.

4. The system of claim 1, wherein the modeled plumes represent spatial spreads of the fluid of interest under different ambient conditions.

5. The system of claim 1, wherein the one or more processors are configured to automatically activate a response action upon detection of a leak, where the response action is physical response action or digital response action.

6. The system of claim 1, wherein the one or more processors are configured to determine a rate at which the fluid of interest is leaking based on one or more of a speed at which an aerial vehicle having a light sensor that obtained the measured concentrations moved while obtaining the measured concentrations, a wind speed, an ambient temperature, or a density of the fluid of interest.

7. The system of claim 1, further comprising:
a light source configured to be disposed onboard an aerial vehicle and to emit a first light at a first wavelength that is at least partially absorbed by the fluid of interest; and
a light sensitive device configured to detect reflection of the first light, wherein the one or more processors are configured to determine the measured concentrations of the fluid of interest based on the reflection of the first light that is detected.

8. The system of claim 7, wherein the light source also is configured to emit a different, second light at a different, second wavelength and the light sensitive device also is configured to detect reflection of the second light, and
wherein the one or more processors also are configured to determine one or more locations of the measured concentrations based on the reflection of the second light.

9. The system of claim 8, wherein the one or more processors are configured to determine a topography of a geographic area where the reflection of the first light is measured as the locations based on the reflection of the second light.

10. The system of claim 7, further comprising a location sensor configured to determine the locations of the measured concentrations, wherein the one or more processors are configured to generate a composite map that presents the locations of the measured concentrations and the measured concentrations.

11. The system of claim 7, wherein the light source and the light sensitive device are configured to be scanned together during determination of the measured concentrations.

12. The system of claim 7, further comprising a moveable mirror configured to reflect the first light in different directions.

13. A system comprising:
one or more processors configured to determine measured concentrations measured by a vehicle of a fluid of interest and locations of the measured concentrations, the one or more processors configured to compare the measured concentrations and the locations with modeled plumes of a leak of the fluid of interest, wherein different modeled plumes are associated with different ambient conditions, and wherein the one or more processors configured to determine an amount of the fluid of interest exiting from the leak using a density of the fluid of interest a wind speed during the measurement, a speed of a vehicle during measurement the measured concentration of a fluid of interest and the time period the fluid of interest was measured.

14. The system of claim 13, wherein the one or more processors are configured to determine one or more ambient conditions in which the measured concentrations of the fluid of interest were obtained and to select at least one of the sets of the modeled plumes for comparing to the measured concentrations based on a comparison of the ambient conditions in which the measured concentrations were obtained and the ambient conditions associated with the sets of the modeled plumes.

15. The system of claim 13, wherein the different sets of the modeled plumes are associated with different amounts of the fluid of interest exiting the source location of the leak, and the one or more processors are configured to determine the amount of the fluid of interest exiting from the leak based on which of the different sets of the modeled plumes more closely matches the measured concentrations of the fluid of interest and the locations of the measured concentrations.

16. A method comprising:
determining measured concentrations of a fluid of interest;
determining locations where the measured concentrations were measured; comparing the measured concentrations and the locations with modeled plumes of a leak of the fluid of interest; and
determining an amount of the fluid of interest exiting from the leak based on comparing the measured concentrations and the locations with modeled plumes of the leak of the fluid of interest using a density of the fluid of interest a wind speed during the measurement a speed of a vehicle during measurement the measured concentration of a fluid of interest and the time period the fluid of interest was measured.

17. The method of claim 16, wherein different sets of the modeled plumes are associated with different ambient conditions, and further comprising:

determining one or more ambient conditions in which the measured concentrations of the fluid of interest were obtained; and selecting at least one of the sets of the modeled plumes for comparing to the measured concentrations based on a comparison of the ambient conditions in which the measured concentrations were obtained and the ambient conditions associated with the sets of the modeled plumes.

18. The method of claim 17, wherein the ambient conditions associated with the different sets of the modeled plumes include one or more of temperature, atmospheric pressure, wind direction, or wind speed.

19. The method of claim 16, wherein the different sets of the modeled plumes are associated with different amounts of the fluid of interest exiting the source location of the leak, and further comprising determining the amount of the fluid of interest exiting from the leak based on which of the different sets of the modeled plumes more closely matches the measured concentrations of the fluid of interest and the locations of the measured concentrations.

20. The method of claim 16, wherein the modeled plumes represent spatial spreads of the fluid of interest under different ambient conditions.

21. The method of claim 16, further comprising automatically closing a valve to stop flow of the fluid of interest responsive to determining the one or more of the amount of the fluid of interest exiting from the leak or the source location of the leak.

* * * * *